United States Patent
Hermans et al.

(10) Patent No.: US 12,443,870 B2
(45) Date of Patent: Oct. 14, 2025

(54) HIGH-SPEED SPATIAL LIGHT MODULATION AND QUANTUM CONTROL

(71) Applicant: Massachusetts Institute of Technology, Cambridge, MA (US)

(72) Inventors: Artur Hermans, Boston, MA (US); Adrian Johannes Menssen, Cambridge, MA (US); Christopher Louis Panuski, Somerville, MA (US); Ian Robert Christen, Cambridge, MA (US); Dirk Robert Englund, Brookline, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 424 days.

(21) Appl. No.: 18/152,638

(22) Filed: Jan. 10, 2023

(65) Prior Publication Data
US 2023/0288637 A1  Sep. 14, 2023

Related U.S. Application Data

(60) Provisional application No. 63/318,636, filed on Mar. 10, 2022, provisional application No. 63/318,725, filed on Mar. 10, 2022.

(51) Int. Cl.
*G06N 10/40* (2022.01)
*G02B 6/12* (2006.01)

(52) U.S. Cl.
CPC ... *G06N 10/40* (2022.01); *G02B 2006/12061* (2013.01); *G02B 2006/12142* (2013.01); *G02F 2203/12* (2013.01); *G02F 2203/15* (2013.01)

(58) Field of Classification Search
CPC ..... G06N 10/00; G06N 10/40; G02F 2203/12
(Continued)

(56) References Cited

U.S. PATENT DOCUMENTS

| 5,285,308 A | 2/1994 | Jenkins et al. |
| 6,396,083 B1 | 5/2002 | Ortiz et al. |

(Continued)

FOREIGN PATENT DOCUMENTS

WO   2020236574 A1   11/2020

OTHER PUBLICATIONS

"Benchmarking an 11-qubit quantum computer" by Wright et al, Nature Communications, 10:5464, pp. 1-6 (Year: 2019).*

(Continued)

*Primary Examiner* — Robert Tavlykaev
(74) *Attorney, Agent, or Firm* — Smith Baluch LLP

(57) ABSTRACT

An atom control architecture based on VIS-IR photonic integrated circuit (PIC) technology is characterized by (1) visible (VIS) and near-infrared (IR) wavelength operation, (2) channel counts extensible beyond 1000s of individually addressable atoms, (3) high intensity modulation extinction and (4) repeatability compatible with low gate errors, and (5) fast switching times. A 16-channel SiN-based APIC with (5.8±0.4) ns response times and <−30 dB extinction ratio at a wavelength of 780 nm. Based on a complementary metal-oxide-semiconductor (CMOS) fabrication process, this atom-control PIC (APIC) technology can be used for atomic, molecular, and optical physics and emerging applications, from quantum computers with cold atoms or ions to quantum networks with solid-state color centers. This APIC technology is especially suitable for scalable quantum information processing based on optically programmable atomic systems.

20 Claims, 24 Drawing Sheets

(58) Field of Classification Search
USPC .......................................................... 706/62
See application file for complete search history.

(56) References Cited

U.S. PATENT DOCUMENTS

| | | | |
|---|---|---|---|
| 8,472,103 | B2 | 6/2013 | Reichelt |
| 10,466,495 | B2 | 11/2019 | Liu et al. |
| 2006/0262378 | A1 | 11/2006 | Machida et al. |
| 2018/0180897 | A1 | 6/2018 | Liu et al. |
| 2021/0270596 | A1* | 9/2021 | Pupeza ................. G01J 3/0208 |
| 2022/0374756 | A1* | 11/2022 | Doherty ................. G06N 10/70 |

OTHER PUBLICATIONS

"High-frequency, resonant acousto-optic modulators fabricated in a MEMS foundry platform" by Valle et al, Optics Letters, vol. 44, No. 15, pp. 3777-3780 (Year: 2019).*

"Integrated optical addressing of an ion qubit" by Mehta et al, Nature Nanotechnology, vol. 11, pp. 1066-1070 (Year: 2016).*

"Hybrid integration methods for on-chip quantum Photonics" by Kim et al, Optica, vol. 7, No. 4, pp. 291-308 (Year: 2020).*

Arbabi et al. "MEMS-tunable dielectric metasurface lens." Nature Communications 9.1 (2018): 1-9.

Benea-Chelmus et al. "Electro-optic spatial light modulator from an engineered organic layer." Nature Communications 12.1 (2021): 1-10.

Block et al. "Optimizing the spatial resolution of photonic crystal label-free imaging." Applied Optics 48.34 (2009): 6567-6574.

Bogaerts et al., "Silicon microring resonators." Laser & Photonics Reviews 6.1 (2012): 47-73.

Chang et al. "Toward the next-generation VR/AR optics: a review of holographic near-eye displays from a human-centric perspective." Optica 7.11 (2020): 1563-1578.

Cicek et al. "Integrated optical vortex beam receivers." Optics Express 24.25 (2016): 28529-28539.

Dong et al., "High-Speed Programmable Photonic Circuits in a Cryogenically Compatible, Visible-NIR 200 Mm CMOS Architecture," arXiv preprint arXiv:2105.12531 (2021), 19 pages.

Ebadi et al. "Quantum phases of matter on a 256-atom programmable quantum simulator." Nature 595.7866 (2021): 227-232, 19 pages.

Elshaari et al., "Thermo-Optic Characterization of Silicon Nitride Resonators for Cryogenic Photonic Circuits," IEEE Photonics Journal 8.3 (2016): 1-9, 10 pages.

Guarino et al. "Electro-optically Tunable Microring Resonators in Lithium Niobate." Nature Photonics 1, 407 (2007) https://doi.org/10.1038/nphoton.2007.93, 4 pages.

Horie et al. "High-speed, phase-dominant spatial light modulation with silicon-based active resonant antennas." ACS Photonics 5.5 (2017): 1711-1717.

Hornbeck "Digital light processing for high-brightness high-resolution applications." Projection Displays III. vol. 3013. SPIE, 1997, 15 pages.

Lee et al. "Back-end deposited silicon photonics for monolithic integration on CMOS." IEEE Journal of Selected Topics in Quantum Electronics 19.2 (2012): 8200207-8200207, 7 pages.

Li et al. "Phase-only transmissive spatial light modulator based on tunable dielectric metasurface." Science 364.6445 (2019): 1087-1090.

Lin et al. All-optical machine learning using diffractive deep neural networks. Science 361, 1004-1008 (2018).

Liu et al. "S4: A free electromagnetic solver for layered periodic structures." Computer Physics Communications 183.10 (2012): 2233-2244, 12 pages.

Menssen et al., "Scalable photonic integrated circuits for programmable control of atomic systems," arXiv preprint arXiv:2210.03100 (2022), 14 pages.

Moreno et al. "Complete polarization control of light from a liquid crystal spatial light modulator." Optics Express 20.1 (2012): 364-376. https://doi.org/10.1364/OE.20.000364.

Park et al. "All-solid-state spatial light modulator with independent phase and amplitude control for three-dimensional LiDAR applications." Nature Nanotechnology 16.1 (2021): 69-76.

Peña et al. "Complete polarization and phase control with a single spatial light modulator for the generation of complex light fields." Laser Physics 28.7 (2018): 076201, 6 pages.

Petraru et al. "Ferroelectric BaTiO 3 thin-film optical waveguide modulators." Applied Physics Letters 81.8 (2002): 1375-1377. https://doi.org/10.1063/1.1498151.

Poulton et al. "Coherent solid-state LIDAR with silicon photonic optical phased arrays." Optics Letters 42.20 (2017): 4091-4094.

Stanfield et al. "CMOS-compatible, piezo-optomechanically tunable photonics for visible wavelengths and cryogenic temperatures." Optics Express 27.20 (2019): 28588-28605 (18 pages.

Wang et al "Theory and applications of guided-mode resonance filters." Applied Optics 32.14 (1993): 2606-2613, 8 pages.

Wang et al. "Nanophotonic lithium niobate electro-optic modulators." Optics Express 26.2 (2018): 1547-1555.

Wang et al. "Optically reconfigurable metasurfaces and photonic devices based on phase change materials." Nature Photonics 10.1 (2016): 60-65.

Wu et al. "Dynamic beam steering with all-dielectric electro-optic III-V multiple-quantum-well metasurfaces." Nature Communications 10.1 (2019): 1-9.

Zeng et al. "Hybrid graphene metasurfaces for high-speed mid-infrared light modulation and single-pixel imaging." Light: Science & Applications 7.1 (2018): 1-8.

Zhu et al. "Arbitrary manipulation of spatial amplitude and phase using phase-only spatial light modulators." Scientific Reports 4.1 (2014): 1-7.

* cited by examiner

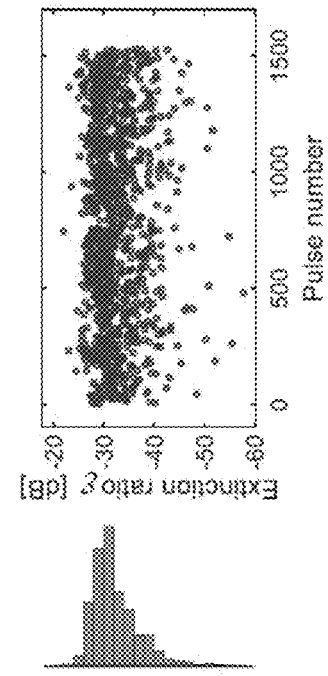
FIG. 5A
FIG. 5B
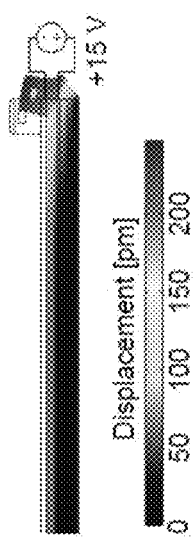
FIG. 5E
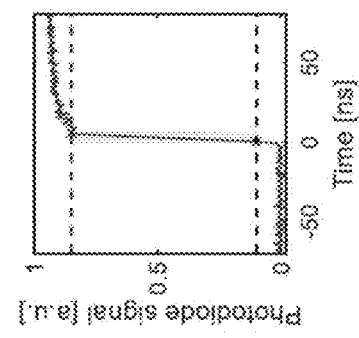
FIG. 5D
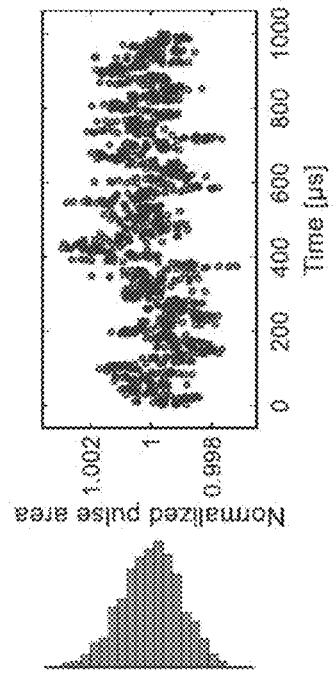
FIG. 5C

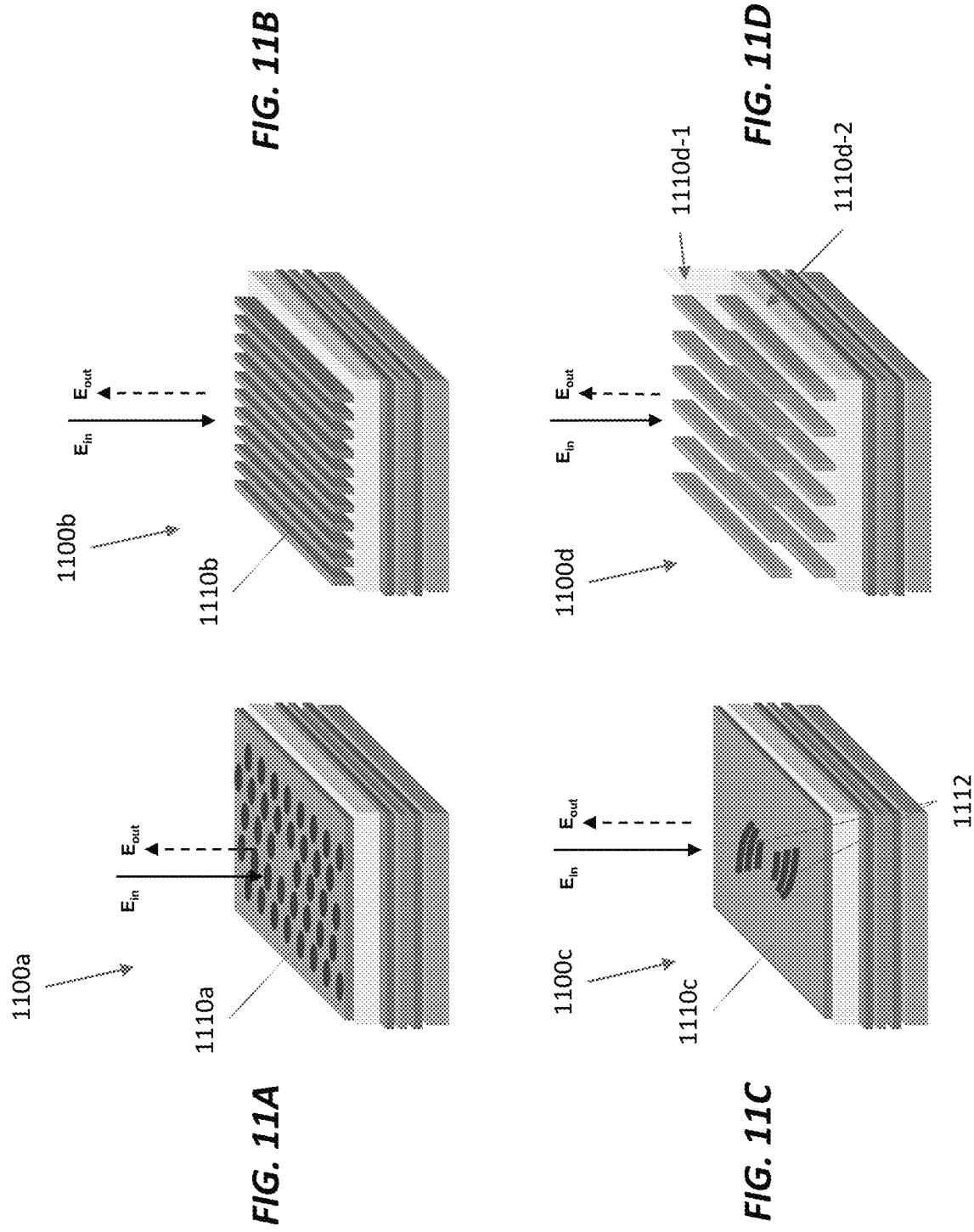

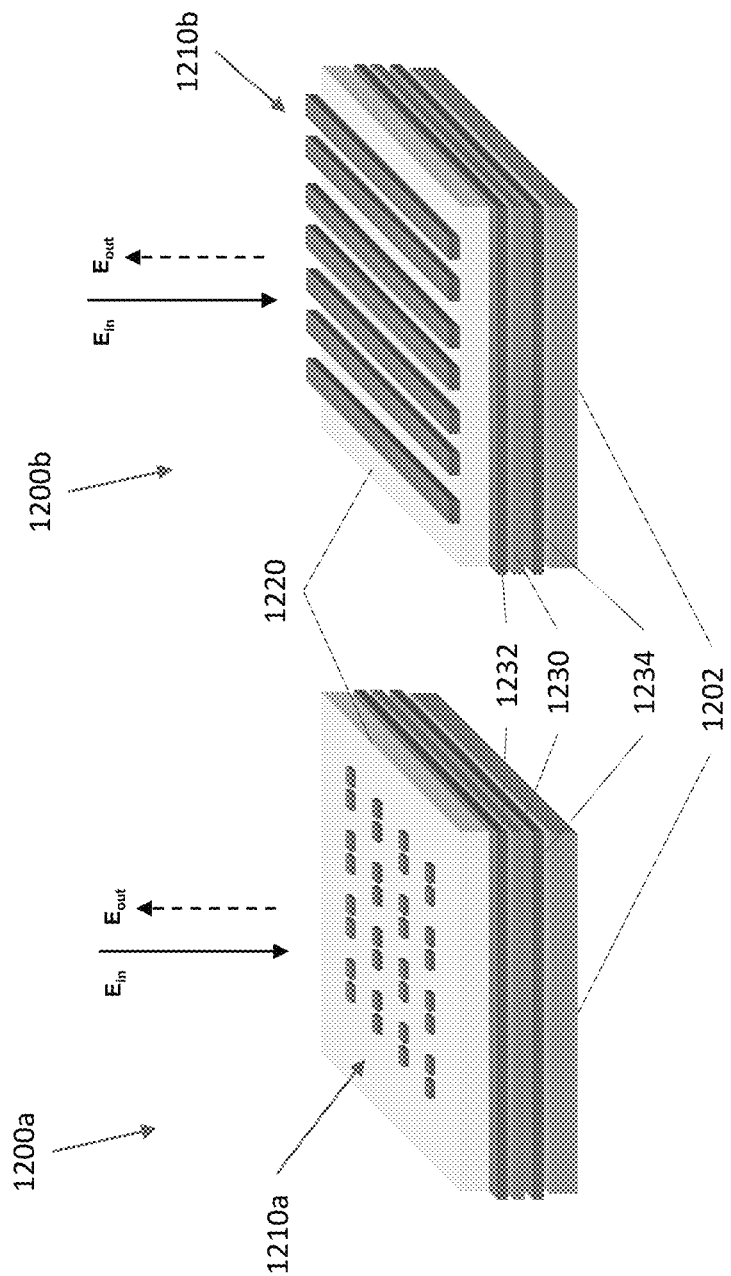

HIGH-SPEED SPATIAL LIGHT MODULATION AND QUANTUM CONTROL

CROSS-REFERENCE TO RELATED APPLICATIONS

This application claims the priority benefit, under 35 U.S.C. 119(e), of U.S. Application No. 63/318,725, filed Mar. 10, 2022, and entitled "High-Speed Spatial Light Modulation and Quantum Control," and of U.S. Application No. 63/318,636, filed Mar. 10, 2022, and entitled "Piezoelectric High-Speed Programmable Metasurfaces." Each of these applications is incorporated herein by reference in its entirety for all purposes.

GOVERNMENT SUPPORT

This invention was made with government support under W911NF-20-1-0021 awarded by the U.S. Army Research Office. The government has certain rights in the invention.

BACKGROUND

One challenge in achieving practically useful quantum technology lies in the scalable, coherent control of individual qubits. As potential candidates for qubits, several platforms that rely on atomic or atom-like systems have emerged, including cold atoms, ions, and atom-like emitters in solids. Many suitable optical transitions of these systems lie in the visible to near-infrared wavelength range. To date, quantum control has relied on using a limited number of local addressing beams modulated by bulk acousto-optic devices. Unfortunately, this approach does not scale well beyond tens of optical control channels.

Current commercially available spatial light modulators (SLMs) can control hundreds to thousands of channels but have response times on the order of milliseconds for liquid-crystal-on-silicon SLMs and microseconds for digital micromirror devices, both of which are too slow for quantum control. In short, SLM technologies based on III-V heterostructures, transparent conductive oxides, two-dimensional materials, phase-change materials, $\chi^{(2)}$ nonlinear materials, liquid crystals, silicon photonics, and micro-electromechanical structures have been demonstrated only at telecom or mid-infrared wavelengths and/or at low modulation rates. Quantum information processors as well as machine learning accelerators, LiDAR, and virtual/augmented reality technology would all benefit greatly from the development of high-speed, large-scale SLMs operating in the visible and near-infrared (IR) wavelength range.

SUMMARY

Atom-control photonic integrated circuit (APIC) technology addresses this bottleneck on the number of optical control channels using compact, resonant, high-speed, and high-extinction modulators that operate with high repeatability. These modulators can be fabricated in a process compatible with modern complementary metal-oxide-semiconductor (CMOS) manufacturing. These on-chip, high-speed modulators can be fabricated in silicon nitride (SiN), which is a leading photonic integration platform compatible with visible-wavelength operation for manipulating atomic and atom-like qubits. SiN is transparent down to blue wavelengths and extremely low waveguide propagation losses have been demonstrated (e.g., <0.1 dB/m at 1.6 μm and 22 dB/m at 450 nm). Moreover, SiN photonic integrated circuits are manufacturable in CMOS fabrication processes and have been demonstrated to enable high power handling, with watt-level waveguide-coupled optical powers reported at 1.6 μm. SiN's thermo-optic effect allows slow modulation with roughly microsecond response times. SiN platforms with aluminum nitride (AlN) piezoelectric actuators can modulate visible and near-infrared light with roughly nanosecond response times for fast optical quantum control.

These modulators for fast optical quantum control can be implemented as high-speed programmable metasurface spatial light modulators (SLMs). Such an SLM can comprise an array of pixels, each of which includes a piezoelectric actuator (e.g., an AlN piezoelectric actuator) and a resonant photonic device, all fabricated with standard semiconductor manufacturing technology. Applying a voltage to the piezoelectric actuator causes strain in the resonant photonic device. This results in a shift of the resonant wavelengths of the photonic device, thereby enabling modulation. The piezoelectric actuation can be done with MHz to GHz bandwidths, much faster than commercially available SLM technologies.

An inventive SLM can include an array of pixels, each of which includes a resonant photonic structure to reflect incident light at a resonance frequency and a piezoelectric actuator, in mechanical communication with the resonant photonic structure, to strain the resonant photonic structure. This strain changes the resonant frequency and the reflectance of the resonant photonic structure. The resonant photonic structure can include a grating, dielectric structure defining a cavity, nanoantenna, photonic crystal, or plasmonic structure and can be deposited on a layer of piezoelectric material. There may be an undercut layer, supporting the layer of piezoelectric material, to enhance the strain applied by the piezoelectric actuator to the resonant photonic structure.

Alternatively, there can be two piezoelectric actuators, with one on either side of the resonant photonic structure. In operation, these piezoelectric actuators laterally strain the resonant photonic structure. The SLM may also include a layer of liquid crystal material, in electromagnetic communication with the resonant photonic structure, to tune the resonance frequency of the resonant photonic structure. And/or it may include a heater, in thermal communication with the resonant photonic structure, to tune the resonance frequency of the resonant photonic structure.

An inventive APIC may include other types of modulators for fast optical quantum control, including an array of vertically coupled amplitude and phase modulators, such as single- or dual-ring Mach-Zehnder modulators. Such an array may perform free-space mode conversion with a large number of programmable degrees of freedom and on-chip phase and amplitude modulation for quantum control of atomic qubits using integrated to free space optics.

These modulators can be used to address a qubit in an array of qubits as follows. An excitation beam is coupled into a resonator (e.g., a resonant ring or cavity) in an array of resonators or modulators integrated into a chip. The resonator modulates the excitation beam, for example, in response to being driven at a mechanical resonance frequency of the resonator. The excitation beam is coupled from the resonator out of the chip and into free space, then illuminates the qubit. In some cases, the excitation beam is combined with a reference beam before illuminating the qubit. The reference beam can be spatially modulated before being combined with the excitation beam or coupled into the resonator. (Similarly, the excitation beam can be spatially modulated before being coupled into the resonator.) Combining the excitation beam with the reference beam can cause destructive interference between the excitation beam and the reference beam. If desired, the reference beam's amplitude and/or phase can be selected so that the destructive interference suppresses the excitation beam by at least 30 dB.

The inventive technology also includes a system for controlling an array of qubits. This system can include an SLM, a polarizing beam splitter (PBS), and an atom-control photonic integrated circuit (APIC). In operation, the SLM fans out an excitation beam into an array of excitation beams in a first polarization state. The PBS (re)directs the array of excitation beams to the APIC. And the APIC generates an array of pulses in a second polarization state orthogonal to the first polarization state from the array of excitation beams and projects the array of pulses onto the array of qubits via the PBS.

The APIC can include arrays of modulators, input couplers, and output couplers. The modulators produce the array of pulses from the array of excitation beams. The input couplers couple the array of excitation beams into the array of modulators. And the output couplers couple the array of pulses out of the APIC. Each modulator in the array of modulators can include a dual-ring Mach-Zehnder modulator (DRMZM) having ring resonators with resonant frequencies tuned by respective piezoelectric elements and respective integrated heaters. The APIC can also include a complementary metal-oxide-semiconductor (CMOS) substrate that supports the modulators and contains electronic components that drive the modulators. The system may also include another SLM to fan out a reference beam into an array of reference beams and a beam splitter to combine the array of reference beams with the array of pulses.

All combinations of the foregoing concepts and additional concepts discussed in greater detail below (provided such concepts are not mutually inconsistent) are part of the inventive subject matter disclosed herein. In particular, all combinations of claimed subject matter appearing at the end of this disclosure are part of the inventive subject matter disclosed herein. The terminology used herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 5A is a plot of normalized pulse area versus time for fast switching using piezoelectric actuation of ring resonators in a DRMZM.

FIG. 5B is a plot of a DRMZM's extinction ratio when modulated with a random pulse train with pulse durations in between 300 ns and 1000 ns.

FIG. 5C is a plot of the measured optical power for a DRMZM driven by a randomized pulse sequence. The optical output power in the "on" state is 0.2 mW.

FIG. 5D is a plot showing the rise time Err for a DRMZM (dashed lines indicate the 90% and 10% output power levels).

FIG. 5E illustrates simulated ring waveguide displacement resulting from applied voltage of 15 V to the bottom electrode of the piezoelectric stack in a DRMZM.

FIG. 11A shows a resonant pixel with a PhC cavity.

FIG. 11B shows a resonant pixel with a high-contrast subwavelength grating with waveguide-array modes propagating up and down between the grating input plane and grating exiting plane.

FIG. 11C shows a resonant pixel with a resonant dielectric antenna.

FIG. 11D shows a resonant pixel with two guided-mode resonant gratings stacked on top of each other. At resonance these gratings act as high-reflectivity mirrors, thus forming a vertical Fabry-Perot cavity.

FIG. 12A shows a resonant pixel with in-plane plasmonic nanoantennas.

FIG. 12B shows a resonant pixel with a 1D array of vertical plasmonic nanoresonators.

DETAILED DESCRIPTION

The present technology includes an Atom-control Photonic Integrated Circuit (APIC) platform for high-fidelity local quantum control of atomic and atom-like systems with high extinction and repeatability. Operating across the visible and near-infrared wavelength ranges, this APIC platform can use SiN photonic integrated circuits with dual-ring-assisted Mach-Zehnder modulators (DRMZMs) or fast AlN piezoelectric actuators. APICs can be fabricated at temperatures<500° C. in a 200 mm wafer, CMOS-compatible process, permitting co-integration with electrical circuits for driving control voltages and implementing feedback. This approach enables APIC control with large channel counts, e.g., hundreds to thousands of channels, each of which might control a different atomic or atom-like qubit.

An APIC with an array of on-chip, photonic resonators and a conventional spatial light modulator (SLM) can be used for modulating beams and projecting the modulated beams onto atoms, atom-like particles, or other qubits. The SLM performs optical fan-out to inject light into a chip that includes an array of resonators/modulators like those described above. The fanned-out light forms a bundle of individual beams. Each of these beams is projected onto the APIC and coupled into the APIC, e.g., to a vertically coupled mode of a photonic crystal or a vertically emitting grating coupler coupled to a resonator/modulator. The resonators/modulators modulate the beams of light to produce an array of fast modulated beams, which are coupled out of the APIC and can be used to control arrays of atomic qubits or atom-like qubits. While conventional SLMs are generally too slow (e.g., they operate at roughly kHz rates) for controlling qubits within the qubits' coherence times, the on-chip, photonic resonators/modulators can modulate light at rates up to several GHz, which is fast enough to control the qubits within their coherence times. This technique is scalable to 1000+ atoms, owing to the high compactness of the integrated modulation architecture.

High-Speed Modulation and Quantum Control

Figure 1A:
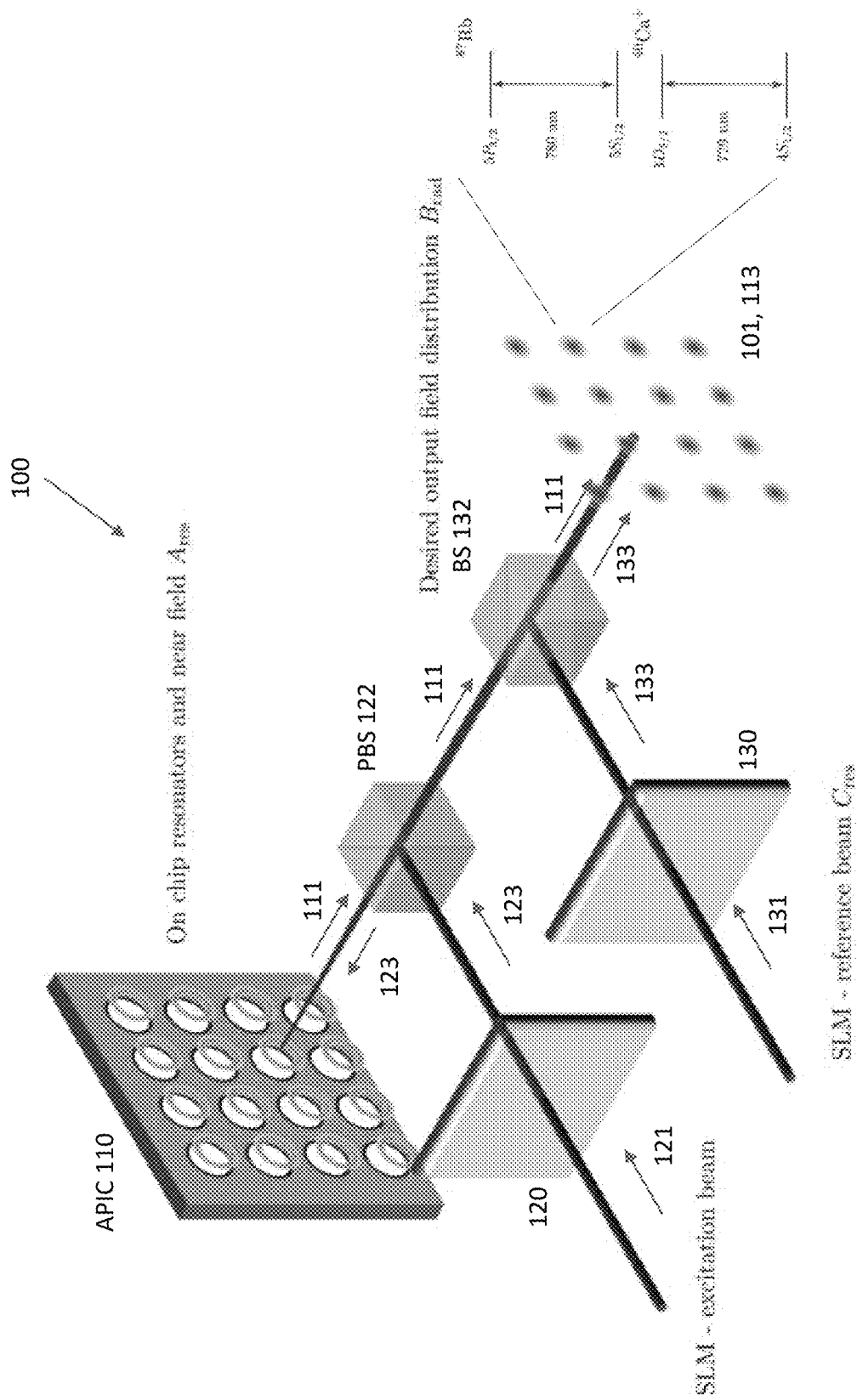
FIG. 1A illustrates an interferometric configuration for high-speed modulation and quantum control, where a combination of spatial light modulators (SLMs) (i) projects the excitation light onto an atom-control photonic integrated circuit (APIC) populated with vertically coupled resonators and (ii) generates reference beams, showing the optical path for a single vertically coupled resonator.
Figure 1B:
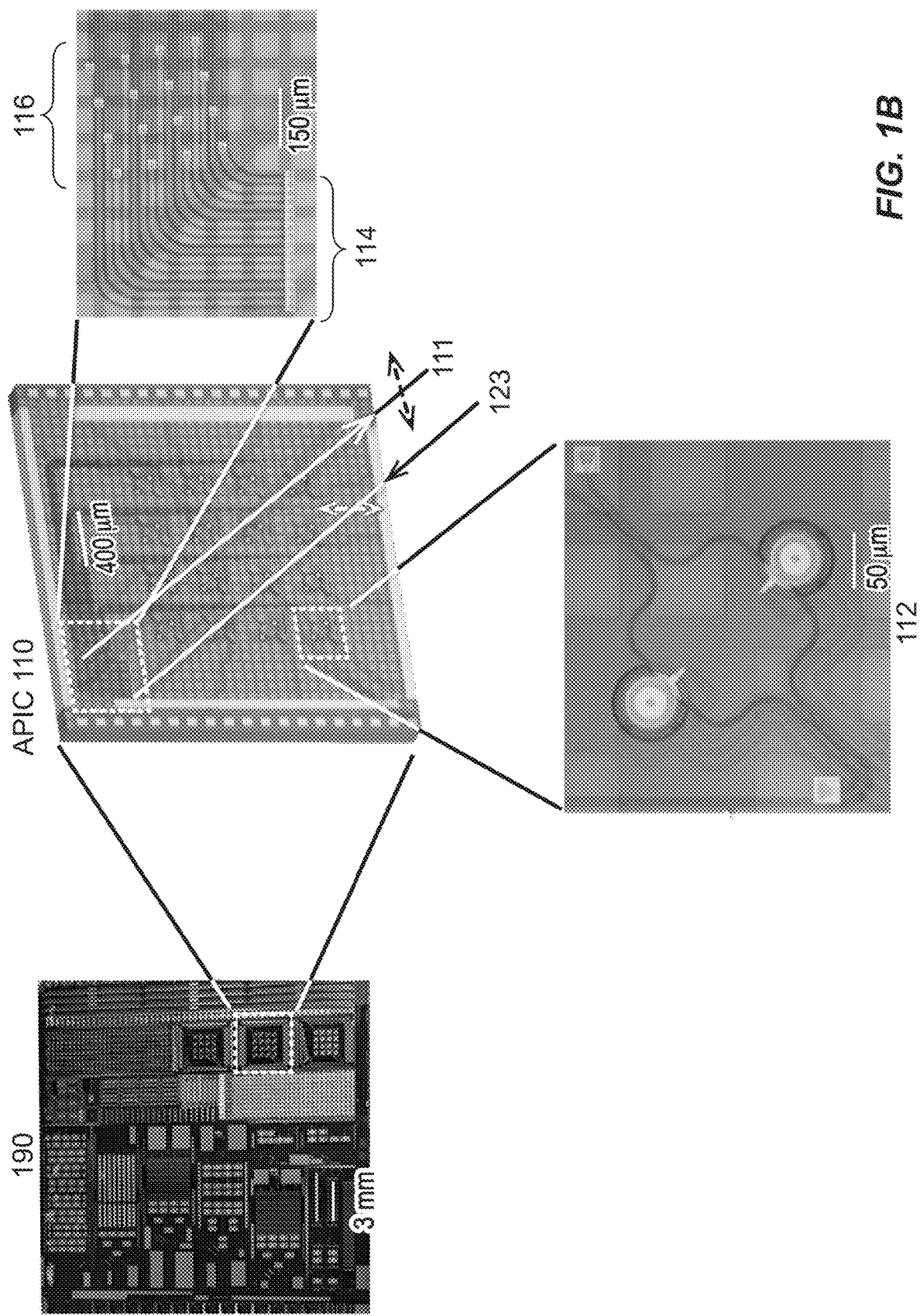
FIG. 1B illustrates an APIC in greater detail.

FIGS. 1A and 1B illustrate different aspects of an interferometric architecture 100 for high-speed modulation and quantum control of an array of atomic or atom-like qubits 101, such as $^{87}Rb$ or $^{40}Ca^+$. This configuration includes three spatial light modulators (SLMs) 110, 120, and 130; a polarizing beam splitter (PBS) 122; and a beam splitter (BS) 132. The first SLM is an atom-control photonic integrated circuit (APIC) 110 with an array of sixteen on-chip, photonic circuit modulators 112. In this example, the modulators 112 are DRMZMs as shown in FIG. 1B and described in greater detail below. Each modulator 112 is coupled via $Si_3N_4$ waveguides to an input coupler 114 and an output coupler 116 that couple light from free space into and out of the APIC 110. The input couplers 114 are arranged in 1×16 array and the output couplers 116 are arranged in a 4×4 array, although other APICs may have different numbers and types of modulators 112 and different numbers of couplers 114, 116 and array arrangements.

The second and third SLMs 120, 130 can be conventional SLMs, e.g., liquid-crystal SLMs, with thousands of pixels each and modulation rates on the order of kilohertz. They provide additional degrees of freedom without taking up space on the APIC 110. As explained below, the third SLM 130 and the BS 132 are optional; they can be omitted if the APIC 110 operates with an extinction ratio high enough to provide the desired quantum control performance.

In operation, the second SLM 120 is used to fan out an excitation beam 121 from a laser source (not shown) to multiple s-polarized excitation beams 123 that are then projected onto the APIC 110 via the first PBS 110. The APIC's modulators 112 modulate the phases and/or amplitudes excitation beams 123 to the desired optical pulse shape(s) at modulation rates of Megahertz or Gigahertz with high shot-to-shot repeatability. The APIC 110 projects the resulting pulses via the output couplers 116 asp-polarized pulses 111 onto the array of atomic qubits 101 via the PBS 122 and the BS 132.

If the extinction ratio of the pulses 111 emitted by the APIC 110 is high enough, then the pulses 111 can be projected directly onto the array of atomic qubits 101. (For quantum control, having a high enough extinction ratio decreases the likelihood of performing an undesired quantum gate operation.) DRMZMs, for example, can operate with (near-)perfect extinction ratios (e.g., ≥35 dB). But other modulators, such as single-ring Mach-Zehnder interferometers, may operate with lower extinction ratios, in which case the pulses 111 can be interfered with reference beams 133 to produce pulses 113 with higher extinction ratios. These reference beams 133 can be produced by using the third SLM 130 to fan out a single reference beam 131. The third SLM 130 modulates the phases and/or amplitudes of these fanned-out reference beams 133 to match the phases and amplitudes, respectively, of the pulses 111 so as to provide (substantially) perfect cancelation at one point in the third SLM's modulation curve. Generally, the phases and amplitudes of the reference beams 133 and pulses 111 should drift slowly enough (e.g., at kHz rates or lower) with respect to each other for the third SLM 130 to track and compensate any mismatch.

The second SLM 120 interfaces between the laser source and the APIC 110, acting as a large programmable switch to uniformly distribute light into each input coupler 114 in the APIC 110. More specifically, the second SLM 120 can be a megapixel liquid crystal SLM that implements this switch holographically with an update rate of about 100 Hz or more. The second SLM's update rate is not fast to provide the speed desired for quantum control directly, but it is ideal for static optical power fanout to balance light across the high-speed modulators 112 in the APIC 110 in a scalable and reconfigurable way. Delegating the input light control to the millions of stable degrees-of-freedom on the second SLM 120 eliminates the need for large-footprint, carefully balanced, fabrication-sensitive splitter trees or similar fan-out elements in the APIC 110. The third SLM 130 performs the same function and offers the same advantages for the reference bam 131.

Figure 2A:
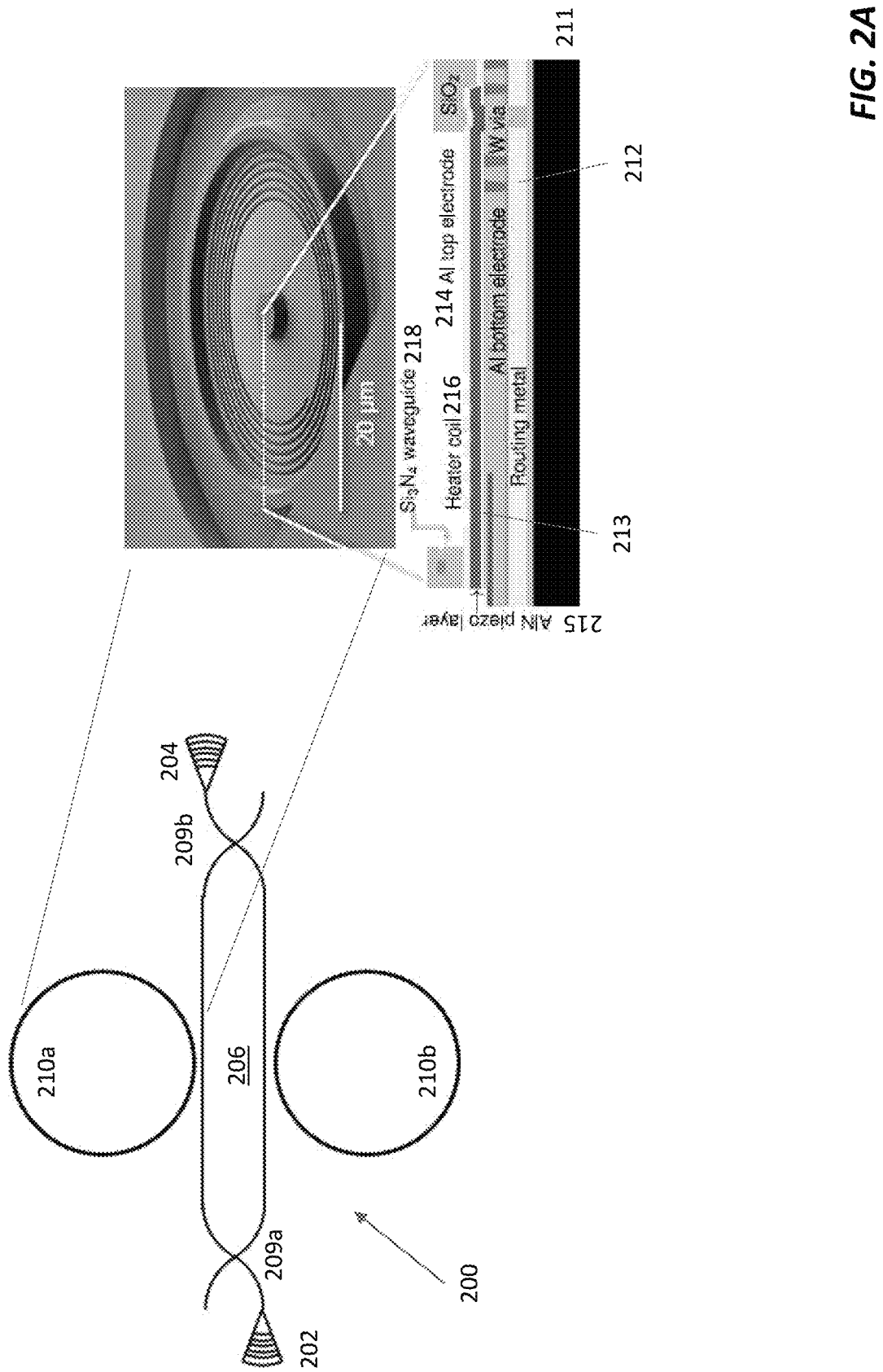
FIG. 2A illustrates a dual-ring Mach-Zehnder modulator (DRMZM) suitable for use in an array on an APIC.
Figure 2B:
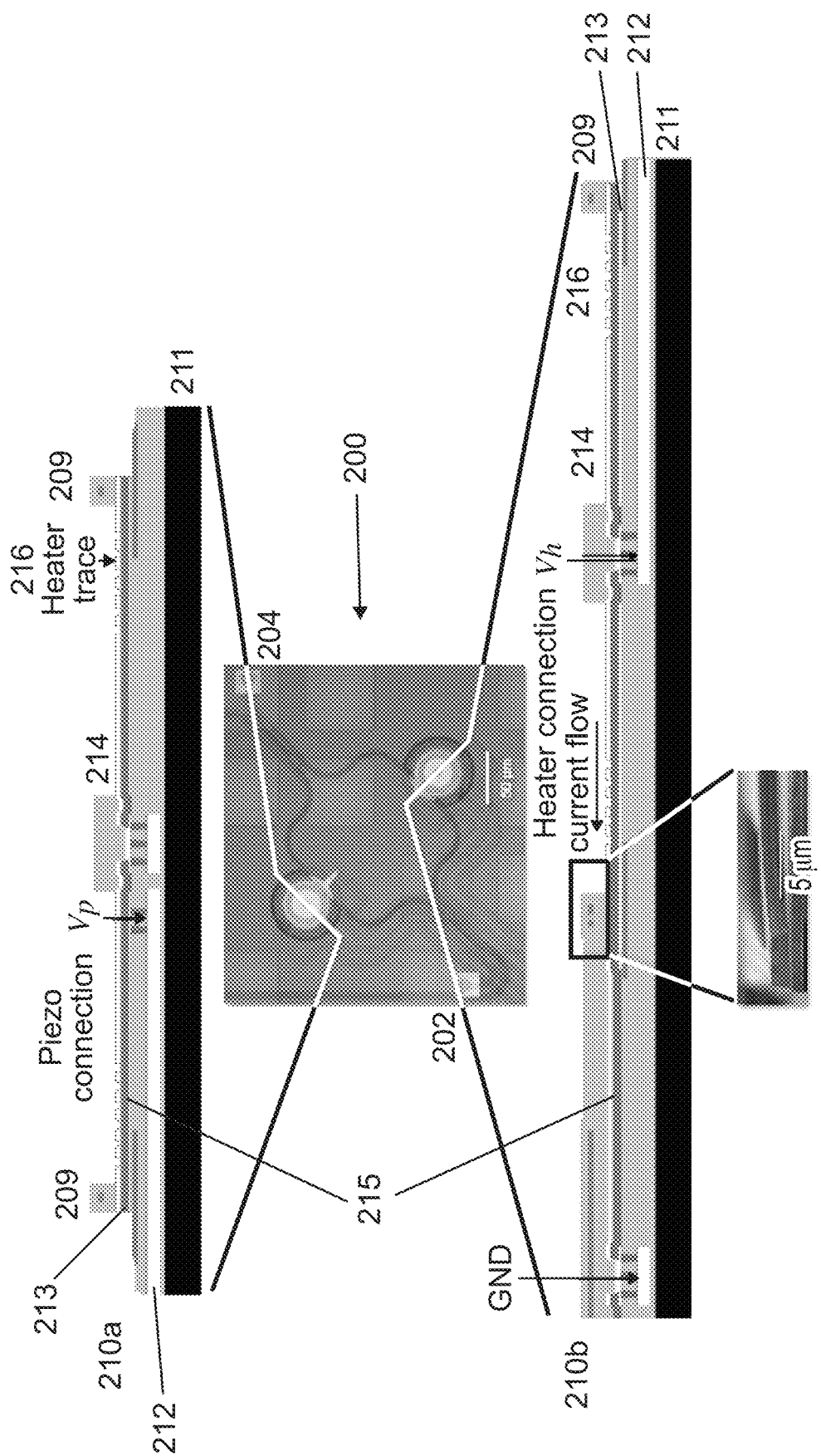
FIG. 2B shows additional views of the DRMZM of FIG. 2A.

To understand the operation of the interferometric architecture 100 in FIG. 1A, consider an on-chip, photonic circuit resonator (modulator 112) with a mode $A_{res}$, a near-field described by electromagnetic fields ($\vec{E}(\vec{r}_\parallel), \vec{B}(\vec{r}_\parallel)$), and a dielectric constant $\epsilon(\vec{r})$, where $\vec{r}_\parallel = (x,y,z_0)$ and $z_0$ is the vertical displacement about one wavelength into the air above the dielectric. This on-chip, photonic circuit resonator is tiled in a lattice with lattice vectors $\vec{r}_{m,n} = m\vec{a}_1 + n\vec{a}_2$, where $a_1$ and $a_2$ are the lattice vectors. That is, $\epsilon(\vec{r}) = \epsilon(\vec{r} - \vec{r}_{m,n})$ as illustrated in FIG. 1A. The structure $\epsilon(\vec{r})$ constitutes a resonator, e.g., as illustrated in FIGS. 2A and 2B, described below. Add a perturbation $\Delta\epsilon_g(\vec{r})$ to this resonator that serves as a grating (e.g., couplers 114 and 116); i.e., the perturbation loads the resonator to couple to vertically propagating optical modes with an intensity given by the Poynting vector S=E×H. This propagating mode is called $A_{rad}(\vec{r},t)$ for the resonator (m,n)=(0,0).

The array of on-chip, photonic circuit modulators 112 can use the electro-optical effect or piezo-electric actuation (e.g., in $LiNbO_3$, BTO, SiN, or AlN) to modulate the dielectric constant locally at MHz or GHz rates. This modulation can be used to individually detune the resonance frequency for each optical resonator, thereby modulating any on-resonance light field.

Assuming a total of $N^2$ modes indexed by (m,n)=(0,0) to (N,N), the near-fields can be described in terms of the orthogonal set of displaced resonator modes, $A_{res}(\vec{r}-)$. Now, in the far-field, assume that a set of displaced modes $B_{rad}(\vec{r})$ is desired. The architecture 100 should achieve a specific transversal field profile as well as modulation of the modes with high extinction. SLMs can convert between that mode set and the resonator modes using one of several techniques. For example, the interferometric technique shown in FIG. 1A converts between free-space and resonator modes to achieve high modulation contrast between discrete states along the modulation curve of the optical modulators 112 in the APIC 100.

To see how the interferometric architecture 100 achieves high modulation contrast, consider the mode field of a resonator (modulator 112) $A_{res}$ that is modulated in phase and amplitude $A_{res}(x,y,t) = A_{res}(x,y)A(t)e^{i\Phi(t)}$ by fast, time-varying phase and amplitude functions without transversal dependence. In this way, a suitably generated static reference field $C_{ref}$ can be selected to achieve a high extinction at a particular point $t_0$ in the modulation curve of the modulator 112. If, for example, $C_{ref} = A_{res}(x,y)A(t_0)e^{i(\Phi(t_0)+\pi)}$, the coherent superposition of the resonator and reference fields gives $A_{res}(x,y)A(t)e^{i\Phi(t)} + A_{res}(x,y)A(t_0)e^{i(\Phi(t_0)+\pi)}$, which vanishes for $t=t_0$.

This interferometric technique can correct fabrication variations that may lead to variations in the coupling condition of the integrated array of modulators 112 in the APIC 110. For instance, when the modulators 112 operate close to the critical coupling condition, any residual light not coupled to the modulators 112 can be coherently cancelled using static reference beams at an appropriate phase and amplitude, projected by the third SLM 130 as depicted in FIG. 1A. In this way, with the combination of on-chip, photonic circuit modulators 112 and one or more (slow) SLMs 120, 130, it becomes possible to generate an output mode pattern that can be modulated with high extinction of the electrical field amplitude. In addition, the photonic circuit modulators 112 can be arrayed at a small pitch (high packing density) because the slow and static degrees of freedom in the field manipulation are delegated to free-space optical components, such as the other SLMs 120, 130 and PBS 112, and BS 132.

FIG. 1B shows the APIC 110 in greater detail. The APIC 110 can be one of several components—and one of several APICs—on the same substrate 190. The input couplers 114 and output couplers 116 can be implemented as vertically radiating gratings that couple the excitation beams 123 and pulses 111 into and out of each modulator 112, shown here as DRMZMs. The inputs and outputs of the modulators 112 are routed together in the upper left corner of the APIC 110 as shown in the upper right of FIG. 1B. Again, the input couplers 114 are arranged as a 1×16 array of grating couplers for coupling the excitation beams 123 into the APIC 110, and a two-dimensional 4×4 array of output grating couplers 116 for coupling the modulated light 111 out towards the target atomic systems 101. The input and output grating couplers 114 and 116 are oriented at 90° with respect to each other so that they receive and transmit, respectively, orthogonally polarized beams, e.g., s- and p-polarized beams. This allows the first PBS 122 to separate the incoming excitation beams 123 from the outgoing pulses 111.

The APIC 110 shown in FIG. 1B was fabricated on a 200 mm silicon wafer using deep ultraviolet optical lithography. After fabrication, the wafer was diced into chips. The chips were glued onto a copper block using a thermal epoxy. Wire bonds connect the chip to a printed circuit board (PCB). The PCB connects the chip to drivers for the heaters and piezoelectric actuators in the modulators. For instance, the heaters can be driven by modules that deliver a maximum voltage of 12 V and a maximum current of 24 mA (per channel). The piezoelectric actuators can be driven by an arbitrary waveform generator with a maximum output rate of 125 MS/s and an output level of ±3 V into 50Ω. This signal was amplified by a factor of five to ±15 V using high-bandwidth electronic amplifiers on the PCB fed by a ±16 V power supply. The maximum slew rate of the amplifiers was 8000 V μs$^{-1}$.

To enhance resonance stability, the rings in the DRMZMs were overcoupled, effectively broadening the linewidth. Each ring could be actuated to $\sim\pi/2$ phase over the voltage range of 30 V achieved by the amplifiers. The measured actuation efficiency was about 0.4 pm/V. The driving voltage of the modulators could be reduced by using enhanced piezoelectric materials, such as scandium-doped AlN, which has a piezoelectric response that is up to five times larger than that of AlN. The modulators can also be operated at lower driving voltages at the expense of a reduced light efficiency, as lower driving voltages result in smaller resonance shifts.

At the system level, a relevant characteristic is the optical power efficiency of each modulator 112 in the APIC 110. For a DRMZM, for example, the optical power efficiency is $\eta = \max_V (|a_{out}(V)|^2)/|a_{in}|^2$, where $a_{in,out}$ is the field amplitude at the input and output of the DRMZM and V is applied voltage. In practice, inefficiency may be dominated by losses in the grating couplers 112 and 114. Fortunately, an aluminum bottom electrode layer (described below with respect to FIGS. 2A and 2B) underneath the grating couplers 112 and 114 boosts efficiency by reflecting light toward the surface of the APIC 110. The aluminum layer 116 enhances the coupling efficiency to yield an approximate per-grating efficiency of 30% and a total throughput of $\eta \approx 10\%$.

The desire for a large channel count motivates high optical channel density $\rho$. The resonant phase modulators used in the DRMZMs afford a higher degree of compactness compared with other phase modulators. With an inter-modulator spacing of 420 µm, the APIC 110 shown in FIG. 1B has a modulator density of approximately six modulators per square millimeter $\rho \sim 6/mm^2$. At this density, a modulator array takes up the entire reticle (2.2 cm×2.2 cm) would have about 2900 modulators, with further improvements to compactness possible.

The SiN APIC 110 in FIG. 1B can achieve pulse errors of $9.8 \cdot 10^{-4}$, extinction ratios $< -30$ dB, and rise times of $(5.8 \pm 0.4)$ ns, enabling high precision optical manipulation of quantum states. Furthermore, fabrication-induced variations in resonance frequencies among the modulators 112 in the APIC 110 can be compensated by integrated heaters or nonvolatile laser trimming. The CMOS compatibility of the fabrication process also enables the APIC 110 to be made directly on top of a high-voltage CMOS driver. There are no fundamental limits to scaling the APIC architecture to thousands of channels. Because the APIC 110 can be made of SiN, it can operate across the entire transparency window of SiN, down to blue wavelengths. Replacing SiN with wide-bandgap waveguiding materials, such as aluminum oxide or nitride, could enable operation down to ultraviolet (UV) wavelengths.

Programmable optical control enabled by an APIC can be used for manipulating quantum systems, especially for atomic quantum control on arrays of neutral atoms or ions. In simulated condensed matter systems, an APIC enables experimental studies beyond global many-body effects and towards local phenomena such as topological defects and their associated quasi-particles.

Quantum Control of Atomic Qubits Using Integrated to Free-Space Optics

Performance metrics for an APIC may be guided by the application specification for optical quantum control. The Rabi frequency of an optically driven atomic transition depends on the electrical field $\vec{E}(x,y,t)$ (transverse coordinates x, y) at the position of the atom. Experimentally, the optical power measured using a photodiode is $P(t) = \int I(x,y,t)$ dA, where $I(x,y,t) \propto |\vec{E}(x,y,t)|^2$. For simplicity, consider a rectangular $\pi$ control pulse with constant light intensity $I_1$ in the "on" state. The extinction is $\varepsilon = I_0/I_1$, where $I_0$ is the residual light intensity in the "off" state. Define the intensity normalized pulse error as $\Delta \mathcal{J} = \Delta I_1/I_1$. Given an intensity error $\Delta I_1$, the "on" state error $1-\mathcal{F}_1 \sim (\Delta \mathcal{J})^2$ is proportional to the square of the intensity error. The "off" state error $1-\mathcal{F} \sim \varepsilon$ scales linearly with extinction. The low intensity error and extinction on $\varepsilon$ and $\Delta \mathcal{J}$ for low pulse error correspond to high intensity modulation extinction and repeatability criteria for quantum control.

The desire for fast switching times $\delta\tau$ follows from the goal of executing many gate operations during the lifetime of the quantum state. Typical gate durations are in the range of tens to hundreds of nanoseconds for single-qubit rotations or entangling gates for cold atom systems, atom-like emitters in solids, and in the range of microseconds to milliseconds for trapped ion motional gates.

Dual-Ring Mach-Zehnder Modulators (DRMZMs)

FIGS. 2A and 2B illustrate a DRMZM 200 like the one shown in FIGS. 1A and 1B. The DRMZM 200 includes a Mach-Zehnder interferometer (MZI) 206 with 50:50 beam splitters 209a and 209b, one of which is coupled to an input coupler 202 and the other of which is coupled to an output coupler 204 (e.g., vertically coupling gratings). Each arm of the MZI 206 is evanescently coupled to a corresponding nanophotonic ring resonator 210a, 210b and an output coupler 204 at one output. This configuration provides phase and amplitude control of the electrical field, as well as extinction ratios of >30 dB in a fabrication-tolerant way. By exploiting the coupled phase and amplitude response of the ring resonators 210, any fabrication-induced imbalance in the directional couplers of the MZI 206 can be compensated for by re-balancing the amplitude of the light in each interferometer arm to achieve—in principle—arbitrary extinction.

The MZI 206 and ring resonators 210 can be formed from $Si_3N_4$ waveguides 218 between $SiO_2$ cladding layers as shown in FIGS. 2A and 2B. The $Si_3N_4$ waveguide 218 for each ring resonator 210 is placed on a corresponding piezoelectric stack as shown at right in FIG. 2A for ring resonator 210a. Each piezoelectric stack includes three metal layers on a CMOS electronics driver substrate 211 and interconnected through vias: a routing layer 212 (Al/Ti), a bottom electrode layer 213 (Al), and a top electrode layer 214 (Al). A piezoelectric layer 215 (e.g., AlN) sandwiched between the bottom and top electrode layers 213 and 214 enables piezoelectric actuation of the ring resonator 210. The bottom and top electrode layers 213 and 214 are connected to bond pads through vias and the bottom metal routing layer 212. An amorphous silicon release layer fabricated below the piezoelectric layer 215 can be used to undercut the piezoelectric actuator via etching. Leaving the piezoelectric actuator unreleased keeps the piezoelectric actuator's stiffness high, allowing for a larger modulation bandwidth of the ring resonator 210. This piezoelectric stack can be actuated electrically at GHz switching rates. The strain induced by the piezoelectric material 215 transfers to the waveguide 218 and causes a shift in the resonance position of the corresponding ring resonator 210 that is on the order of the ring resonator's linewidth.

Each ring resonator 210 also includes an integrated heater coil 216 between the piezoelectric layer 215 and the waveguide 218 for larger range tuning of its resonance position via the thermo-optic effect. The integrated heater coil 216 allows for tuning the rings within the fabrication variation induced distribution of resonance positions of the ring resonators 210. The heater coils 216 and piezoelectric layers 215 can be operably coupled to and controlled by transistors and other electronic components in the CMOS electronics driver substrate 211.

Figures 3A, 3B, 3C:
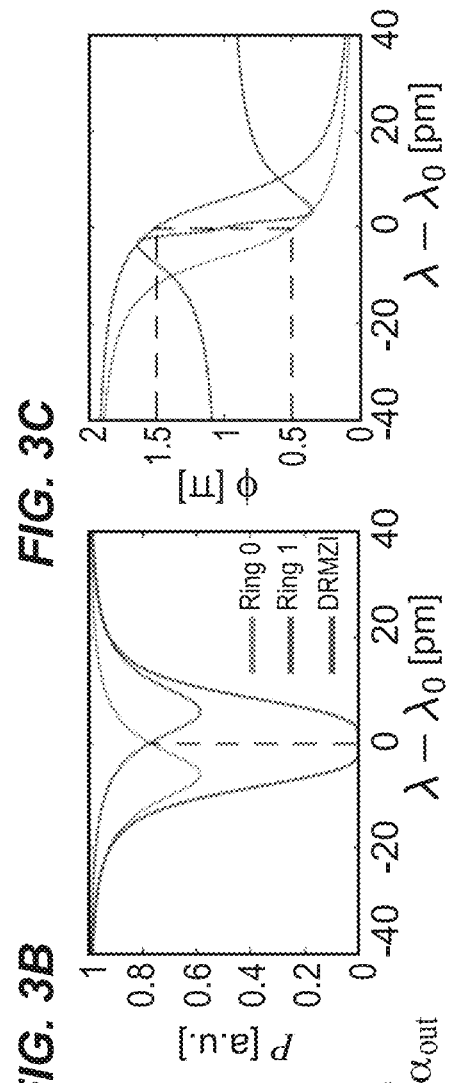
FIG. 3A is a schematic of a DRMZM annotated with relevant operating parameters.
FIG. 3B shows the transmitted powers $P=|a_{out}|^2$ around a target wavelength $\lambda_0$ for the individual ring resonators 210 and the DRMZM 200.
FIG. 3C shows the phase $\varphi=\arg(a_{out})$ responses.

In operation, ring resonator 210 in the DRMZM 200 acts as a coupled phase and amplitude modulator with the following response function:

$$a_{SRout} = a_{SRin} e^{i(\pi+\varphi)} \frac{\alpha - t e^{-i\varphi}}{1 - t\alpha e^{i\varphi}},$$

where $\alpha_{SRin,out}$ is the field amplitude at the input and output of a single ring, $\alpha$ is the attenuation coefficient for a single round trip in the ring, t is the bus waveguide's self-coupling coefficient, and $\varphi$ is the round-trip phase. The piezoelectric actuator provides fast modulation. In the over-coupled regime ($t<\alpha$), the ring acts as a multiplier for phase, where the small phase shifts possible through the fast but weak piezoelectric actuators can be amplified to a ~$2\pi$ phase shift per ring as shown in FIG. 3C. The local heater in each ring resonator 210 provides long range tuning, shown in FIG. 3D, to compensate for fabrication variations as discussed below.

Each over-coupled ring also modulates the amplitude in each arm of the MZI 206. Light in each bus waveguide 218 interferes with light leaking out of the corresponding ring resonator 210. Changing the resonance frequency of the ring resonator 210 modulates the light leaking out of the ring resonator 218 and hence changes the interference with the light in the bus waveguide 218. The coupling coefficient from the ring resonator 210 to the bus waveguide 218 only negligibly changes during the modulation.

Choosing the appropriate operating points of the ring resonators 210 makes it possible to select amplitude and phase in each interferometer arm to achieve—in principle—perfect destructive interference at the output port of the interferometer's second beam splitter 209b. Furthermore, the two available degrees of freedom (phase tuning in both rings) afford full amplitude and phase control over the output electrical field. This full field control is especially desirable in protocols where the phase of the optical field should be changed quickly.

FIGS. 3A-3E illustrate behavior of the DRMZM 200 of FIGS. 2A and 2B. FIG. 3A shows the DRMZM 200 with labels for the input light amplitude $a_{in}$, along with the transmissive amplitude coupling coefficients for beam splitters ($T_{0,1}$) and ring-waveguide ($t_{0,1}$), and the piezoelectric actuator and heater voltages, $V_{p0,1}$ and $V_{h0,1}$, used for modulation and long-range tuning. $\alpha_{0,1}$ represents the single round-trip ring transmission.

FIGS. 3B and 3C show the simulated phase and amplitude response for both the isolated rings 210 and the DRMZM 200 as a function of wavelength, assuming the beam splitters and rings are identical. Perfect extinction at the output port occurs when the differential phase is $\pi$ and the optical amplitudes in both MZI arms are balanced exactly to match the amplitude splitting ratio of the out-coupling beam splitter 209b.

Figure 3D:
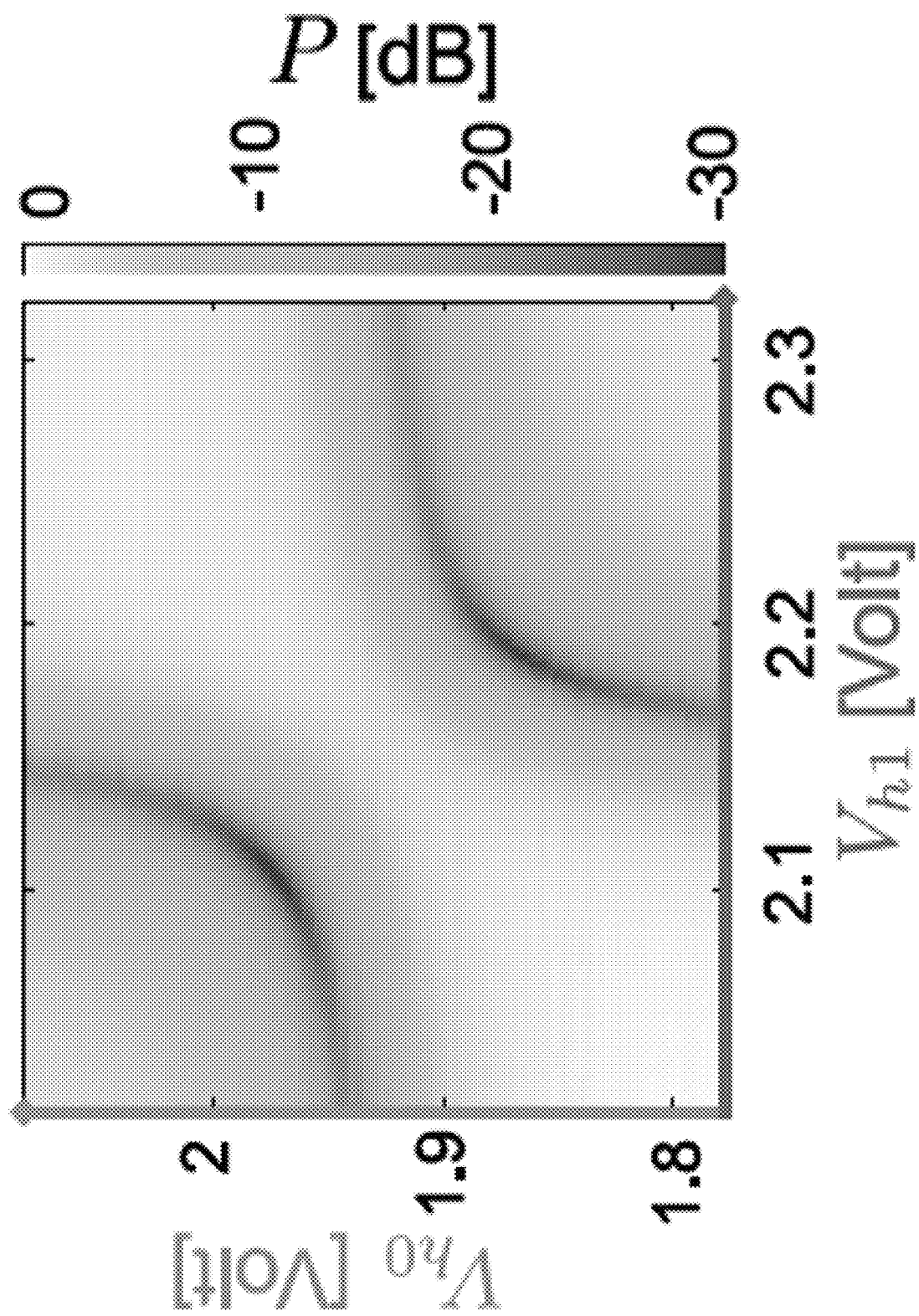
FIG. 3D shows the measured normalized power $P=10\log_{10}(|a_{out}|^2/\max(|a_{out}|^2))$ as a function of the heater voltages.
Figure 3E:
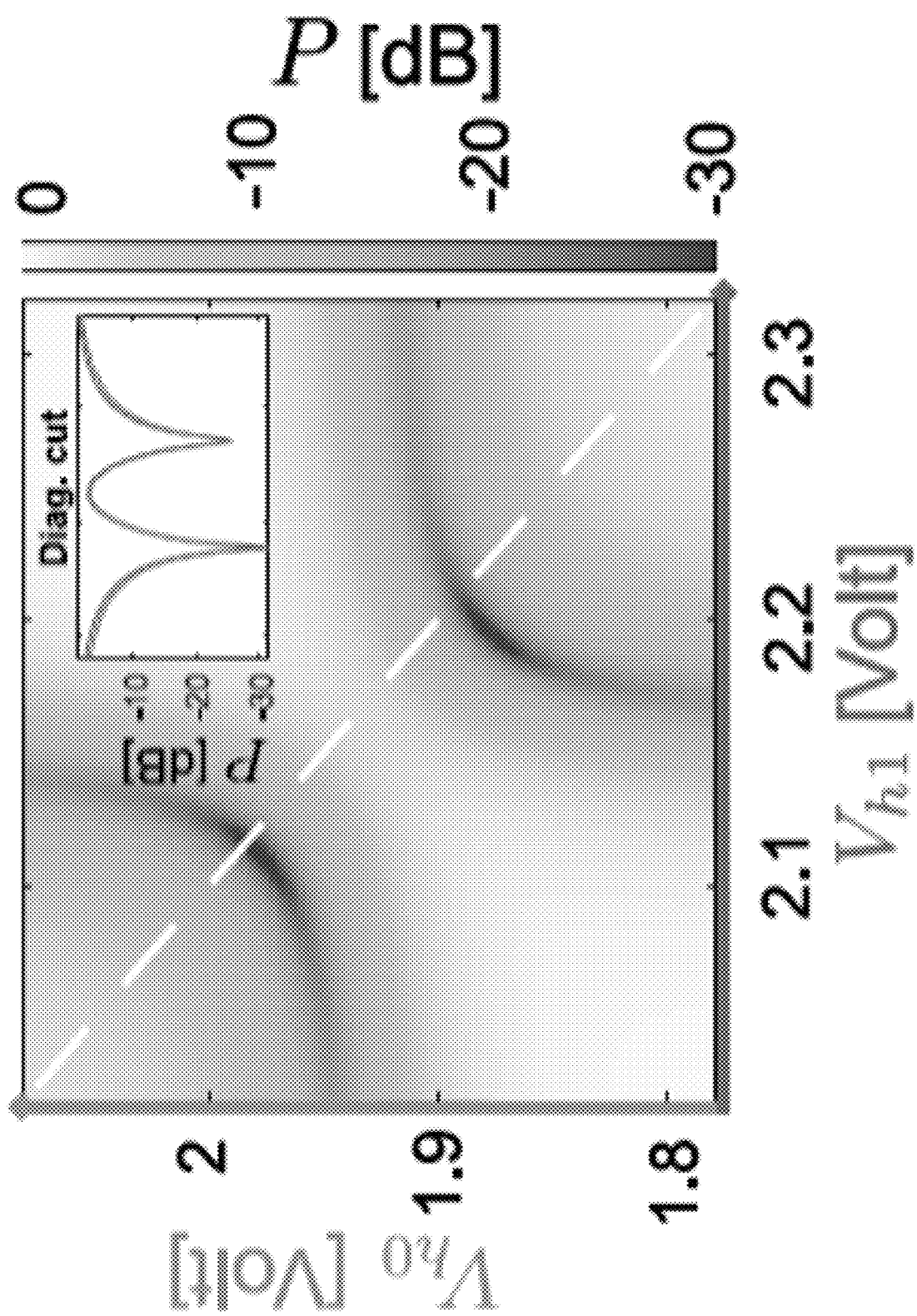
FIG. 3E shows a fit of the measured data in FIG. 3D to a model with the parameters: $\alpha_0=0.9962\pm1.7\cdot10^{-4}$, $\alpha_1=0.9975\pm1.9\cdot10^{-4}$, $t_0=0.983\pm1.8\cdot10^{-4}$, $t_0=0.9816\pm2\cdot10^{-4}.=0.983\pm1.8\cdot10^{-4}\cdot T_{0,1}^2=0.5$ are fixed. The $R^2$ value of the fit is 0.96. These values for $\alpha_{0,1}$ yield fitted intrinsic quality factors $Q_{i0}=2.7\cdot10^5\pm1.34\cdot10^4$ and $Q_{i1}=4\cdot10^5\pm3\cdot10^4$. The inset shows the profile along the dotted diagonal line.

FIG. 3D shows the experimentally measured output light power as a function of the heater voltages for each ring resonator, which are used for long-range tuning to this (ideal) operating point. The points of minimum power are clearly visible in both branches of the "avoided crossing" of the two resonances ($\varepsilon$=−31 dB in the top branch and −30 dB in the bottom branch). The experimental data are fit to a model with parameters defined in FIG. 3A. FIG. 3E shows the result, which is in good agreement with the measured data ($R^2$=0.96).

DRMZM extinction is robust to large fabrication variations, in contrast to regular Mach-Zehnder modulators (MZMs). In a regular MZM, the principal limitation to the achievable light extinction is given by how well the two beam splitters comprising the MZM are matched to each other. Unequal beam splitter ratios in the DRMZM are manifest in the output power distribution as a breaking of mirror symmetry along the diagonal as shown in FIG. 3E. The two points of minimum power translate along both branches as the difference between the beam splitters increases.

Figure 3F:
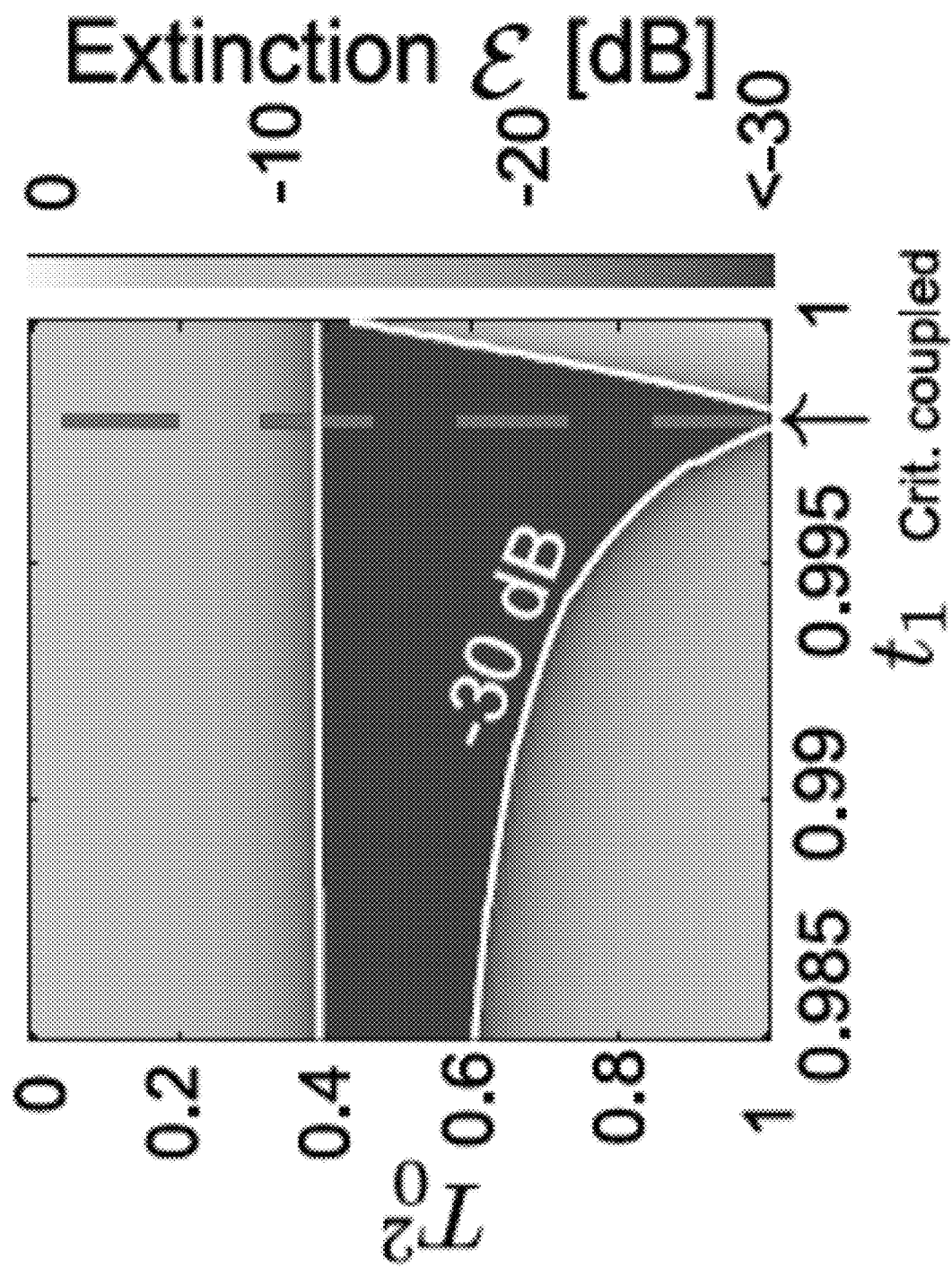
FIG. 3F shows the numerically extracted extinction achievable as a function of $T_0^2(T_1^2=0.5)$ and $t_1(t_0=0.985)$, with $\alpha_{0,1}=0.998$. The darkly shaded region inside the contour indicates better than −30 dB extinction.

FIG. 3F is a plot of the extinction ratio versus the coupling ratios for the input beam splitter (vertical axis) and upper ring resonator (horizontal axis). The vertical dashed line indicates critical coupling, which is the boundary between over-coupling (left of the dashed line) and under-coupling (right of the dashed line). FIG. 3 shows that a high extinction is achievable for a wide range of fabricated parameters. Without being bound by any particular theory, the primary limitations to the measured extinction ratio seem to originate from small drifts of the resonance position during the measurement along with input polarization misalignment.

Fabrication-induced variations in resonance frequency are a major issue in integrated photonic devices, including DRMZMs. While the piezoelectric actuators in the ring resonators are fast, their tuning range is not sufficient to account for this fabrication-induced resonance spread. In an APIC with an array of DRMZMs, the as-fabricated resonances may be distributed over hundreds of picometers or tens of linewidths, making modulation of a single laser frequency across the full array of devices challenging. The DRMZMs in an array can be tuned to a common resonance using a combination of tunable and nonvolatile resonance shifting based on (i) integrated heaters and (ii) laser trimming.

As shown in FIGS. 2A and 2B, a resistive heating coil in proximity of the ring resonator waveguide can generate heating power for reconfigurable thermo-optic tuning. The resonance tuning efficiencies of these heating coils can be about 6 pm/mW. This indicates that fabrication spread can be negated using moderate powers, e.g., on the order of 50 mW per ring.

To complement thermal tuning and relax constraints on dissipated power, the resonances of the ring resonators can be permanently but non-reversibly shifted by trimming with a blue laser, notably without degradation of the optical quality factor. The accessible trimming range is larger than the observed variations in resonance positions. Laser trimming is precise enough to target within the limited range of piezoelectric actuation.

Figure 4A:
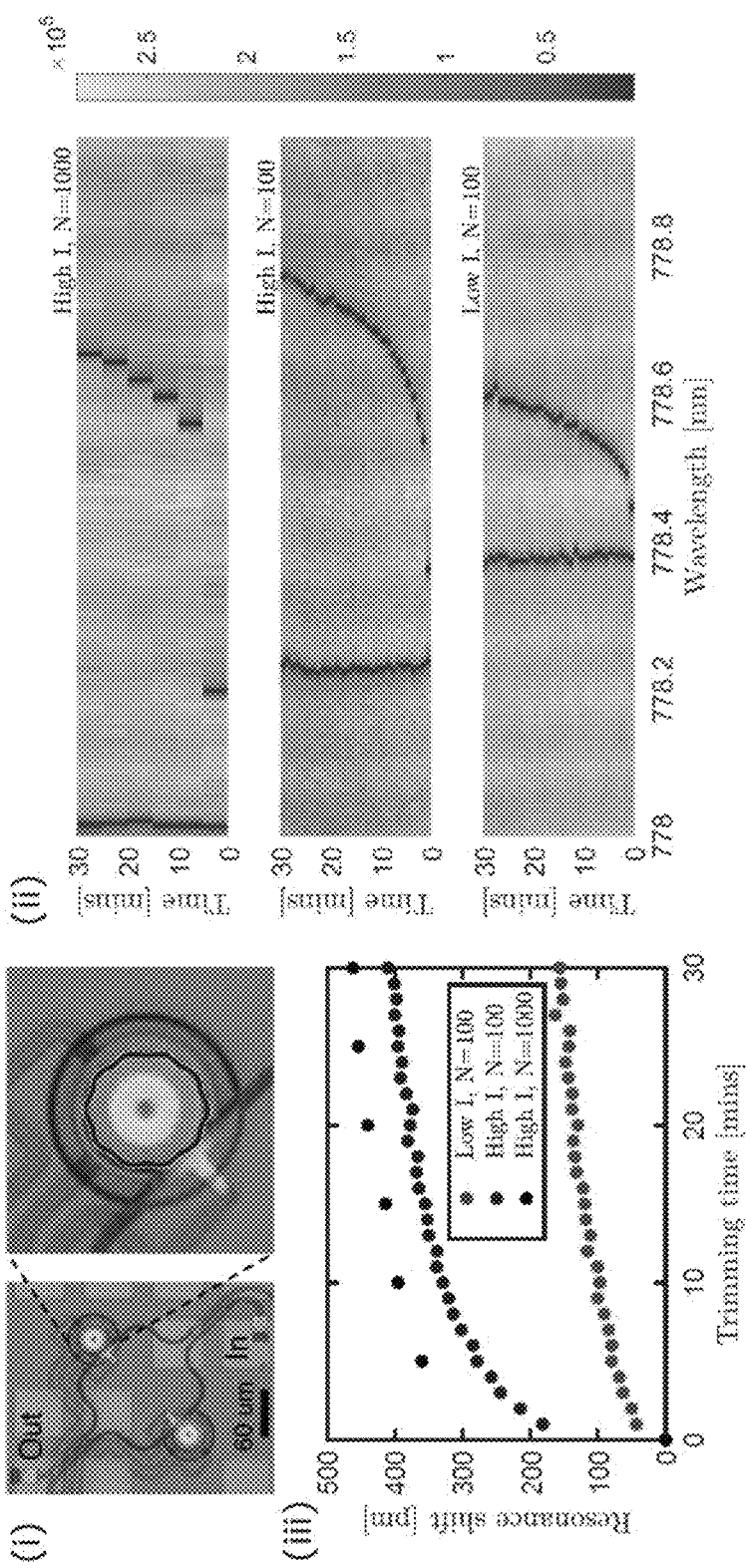
FIG. 4A illustrates laser trimming, including: (i) a microscope image of a DRMZM with a focused trimming laser whose dithered radius overlaps with one of the SiN ring resonators in the DRMZM; (ii) a collection of measurements for the laser-trimmed resonance across multiple modulators; and (iii) the resonance shift versus trimming time based on the collection of measurements, where N is the number of trimming steps per round trip and I=0.1 (0.5) mW µm$^{-2}$ is the low (hight) trimming laser intensity.

FIG. 4A illustrates using laser trimming to permanently shift the resonance frequency of a ring resonator in a DRMZM. A blue, continuous-wave (CW) trimming laser beam enters the ring resonator via an additional path that includes another SLM for controllable beam focusing and positioning. This path is merged into the existing fanout and characterization paths by using a long-pass dichroic filter directly before an objective. The setup delivers trimming power up to 40 mW transmitted through the objective with a measured efficiency of 74% diffracted towards the first order mode, which is used for trimming. The focused beam radius at $1/e^2$ intensity is measured to be 4 μm at the plane of the chip. Tuning is accomplished by scanning this SLM-programmable first order beam across the waveguide in a dithered circular pattern as shown in FIG. 4A(i): a circle with a sinusoidal perturbation to radius to compensate for any misalignment between the center of the trimming path and the center of the targeted ring. This path can be broken into N steps around the circle. Every step along the circle takes about 0.25 seconds, and N varies with experiment according to FIG. 4A(iii). Once the laser intensity and the SLM scanning parameters are set, the trimming light stays on. A shutter in the trimming path opens and closes to expose the ring resonator for either one minute or five minutes.

FIG. 4A(ii) shows the two resonances of the DRMZM at the end of each exposure. In these examples, the resonance to the left is unperturbed (with small variations stemming from temperature fluctuations) and serves as the reference, while the other is red-shifted in wavelength due to laser trimming. These results show that this post-fabrication trimming is wide enough (e.g., ~0.4 nm) to compensate for standard observed resonance spread in a 4×4 APC. Select a chip with resonances close to the desired wavelength reduces or minimizes the trimming power/duration to reach that wavelength.

In addition, FIG. 4A shows no significant change in the extracted full width at half maximum (inversely proportional to quality factor Q). Measuring the laser-trimmed devices again after roughly one month of ambient storage showed no relaxation in trimming. The heaters and piezo actuators underneath the ring resonators operated after the laser trimming.

The results shown in FIG. 4A were obtained with a laser trimming beam at 405 nm generated by a fiber-coupled source. Laser trimming can also be performed at other wavelengths (e.g., 445 nm) with laser diodes or other suitable sources. The diffraction-limited mode size of the fiber-coupled source made it possible to calibrate these supplementary trimming results. We operate the 445 nm diode at 1 A and deliver 420 mW to the first-order, but achieve an averaged intensity of only about 0.6 mW µm−2 due to its larger spatial mode.

Figure 4B:
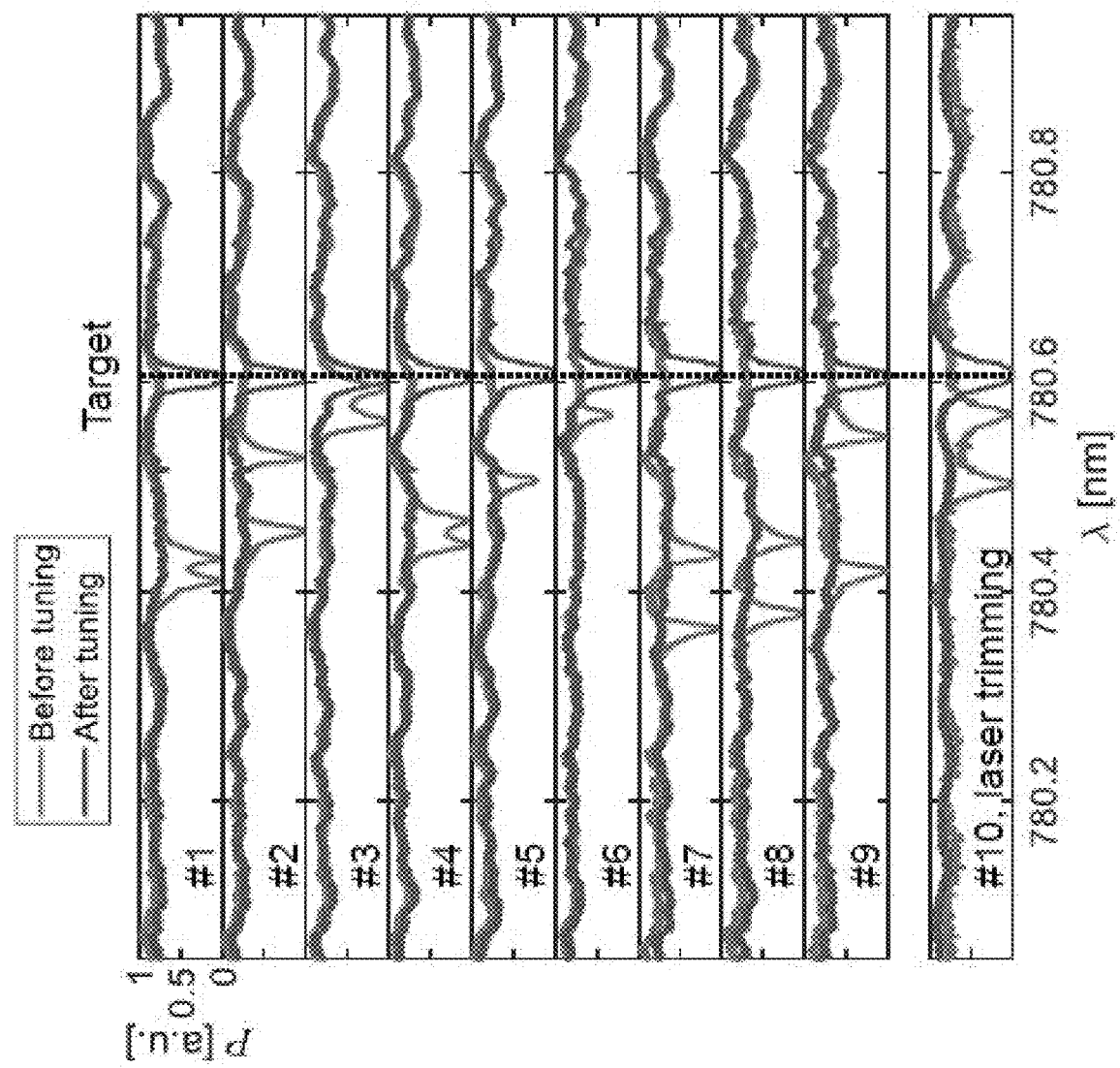
FIG. 4B illustrates resonance tuning of ten DRMZMs to a common target wavelength.

FIG. 4B illustrates resonance tuning of an array of ten DRMZMs. The top nine panels show the simultaneous alignment of the eighteen resonances (two each) of nine DRMZMs to a target wavelength (780.6 nm) using the DRMZM's integrated heaters. The bottom panel shows resonance alignment for a tenth DRMZM using nonvolatile laser trimming.

Figure 4C:
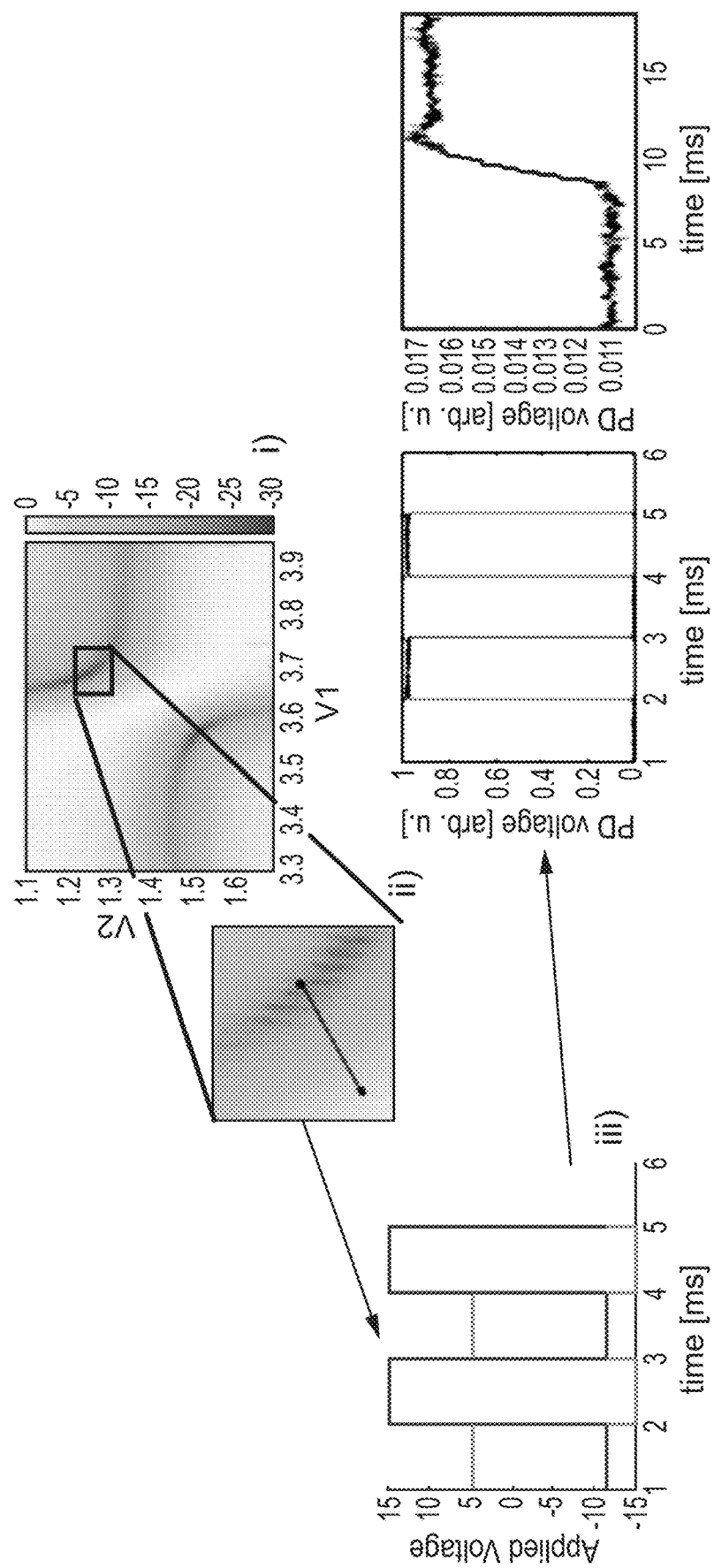
FIG. 4C illustrates a process for tuning the ring resonators in a DRMZM.

Alternatively, FIG. 4C shows experimental data demonstrating how the operating points of the DRMZM can be determined and the execution of a control pulse sequence using thermo-optic and piezoelectric tuning. First (i), a wide range 2D thermal scan of the ring resonances is performed and a thermal operating point at the desired wavelength for the two ring resonators is set. (Each ring represents and controls one dimension in this 2D thermal scan.) This operating point implies some partial overlap of the resonances. Next, a second 2D voltage scan (ii), this time scanning the piezoelectric actuator voltage of each ring, yields two operating points in terms of the piezoelectric actuator voltages applied to the respective rings. Then a pulse sequence (iii) is executed between the light minimum and some arbitrary amplitude and phase. At these set points (iv), the DRMZM operates with extinctions of >30 dB and switching speeds of <5 ns.

With resonances aligned at a desired operating point, the DRMZMs can operate as fast light modulators with repeatable switching at high extinction ratios under piezoelectric actuation. FIG. 5A plots the measured normalized individual pulse area for a 1 MHz rectangular pulse train of 1 ms total duration driving a DRMZM. This measurement indicates a pulse area consistency with a (1σ) standard deviation of $\Delta \mathcal{J} = 9.8 \cdot 10^{-4}$. FIG. 5D shows the fast switching behavior of a DRMZM, with a 10-90% rise time of (5.8±0.4) ns. Further, the DRMZM exhibits an extinction ratio of ε~−30 dB during switching. FIG. 5B shows the extinction ratios for a DRMZM driven by a pulse sequence with randomized pulse lengths (between 300 ns and 1 µs), as displayed in FIG. 5C. TABLE 1 (below) summarizes performance metrics of the DRMZM.

TABLE 1

DRMZM Performance Metrics.

| Metric | Symbol | Value | Criterion |
|---|---|---|---|
| Wavelength | $\lambda_0$ | 780 nm | Visible/Infrared Operation |
| Channel Density | ρ | 6/mm² | High Channel Count |
| Power Efficiency | η | 10% | High Channel Count |
| Extinction | ε | <−30 dB | High Extinction |
| Infidelity "Off" State | $1 - \mathcal{F}_0$ | $1.5 \cdot 10^{-3}$ | High Extinction |
| Pulse Error | $\Delta \mathcal{J}$ | $1 \cdot 10^{-3}$ | High Repeatability |
| Infidelity "On" State | $1 - \mathcal{F}_1$ | $2.5 \cdot 10^{-6}$ | High Repeatability |
| 10-90% Rise Time | δτ | (5.8 ± 0.4) ns | Fast Switching Times |

Single-Ring Modulators

Figure 6B:
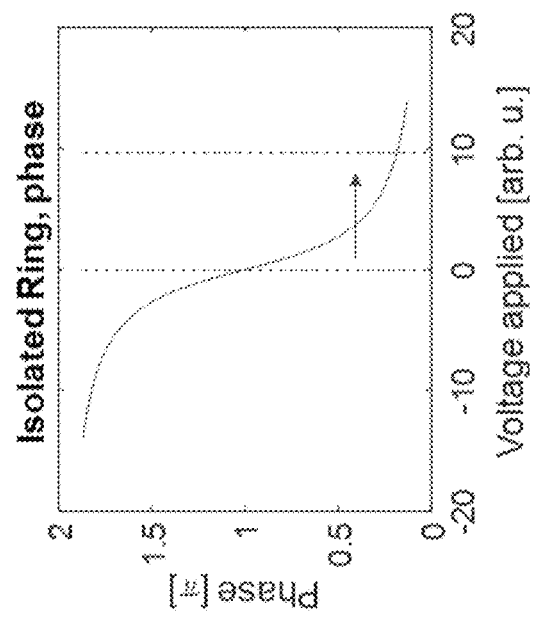
FIG. 6B shows the simulated amplitude response of a single electrically actuated, over-coupled ring resonator.
Figure 6C:
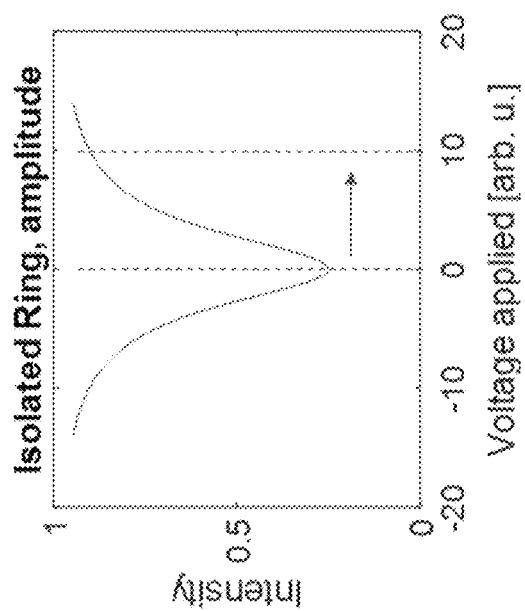
FIG. 6C shows the simulated phase response of a single electrically actuated, over-coupled ring resonator.
Figure 6A:
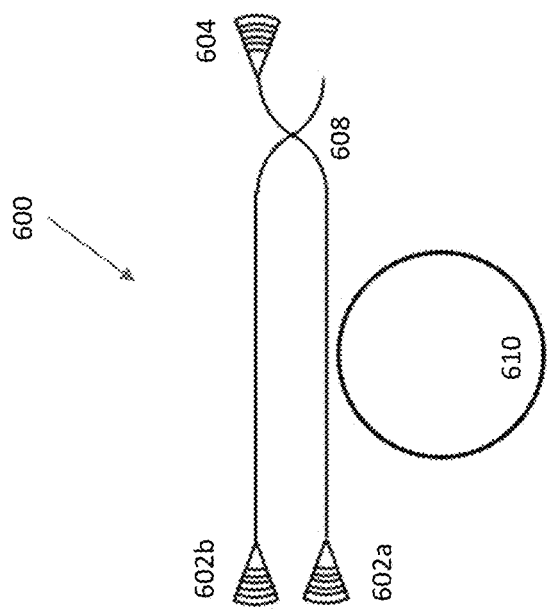
FIG. 6A shows a modulator with a piezoelectrically and thermally actuated ring resonator over-coupled to one input arm of a four-port beam splitter.

FIGS. 6A-6C illustrate a single-ring modulator 600 that can be used instead of a DRMZM in an APIC or other array of integrated resonant modulators. The single-ring modulator 600 is simpler than a DRMZM and gives good extinction performance with an externally provide reference beam.

The modulator 600 includes integrated waveguides and a (nominally) 50:50 beam splitter 608 arranged with an over-coupled, electrically actuated ring resonator 610 evanescently over-coupled to one input arm. In operation, an input grating 602a receives an input beam and couples it to the ring resonator 610 via the waveguide in the interferometer arm. Like the ring resonators in a DRMZM, this ring resonator 610 can be tuned with an integrated heater and/or an integrated piezoelectric actuator. The waveguide guides light coupled out of the ring resonator 610 to the integrated beam splitter 608. A second beam (a reference beam for better extinction performance) is coupled to an input grating 602b coupled to the other interferometer arm, which guides the second beam to the integrated beam splitter 608, where both beams interfere to produce an output that is coupled out via an output grating 604 coupled to another port of the integrated beam splitter 608.

The field at the output of the ring resonator 610 is given by:

$$a_{out}(V) = a_{in} \frac{e^{i(\pi + \phi(V))}(a - te^{-i\phi(V)})}{1 - ate^{i\phi(V)}},$$

where a is the single-pass amplitude transmission through the ring and t is the self-coupling coefficient. Critical coupling is achieved when the single-pass transmission of the ring equals the self-coupling coefficient, i.e., when a=t·φ(V) is the phase accumulated in a single ring round-trip. This phase is modulated by an actuation voltage V. FIGS. 6B and 6C show the amplitude and phase, respectively, versus applied voltage for piezoelectrically actuating the ring resonator 610. The dashed lines indicate the frequency of the excitation light in relation to the applied voltage (the laser frequency is kept the same as piezoelectric element shifts the resonance frequency of the resonator).

Resonant Modulators

Figure 7C:
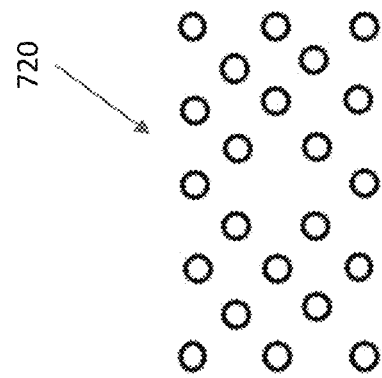
FIG. 7C shows a vertically coupled photonic crystal cavity.
Figure 7B:
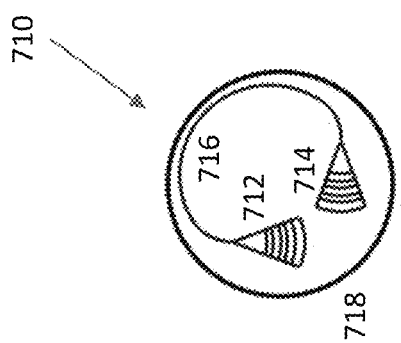
FIG. 7B shows a ring resonator evanescently coupled to gratings for vertical coupling.
Figure 7A:
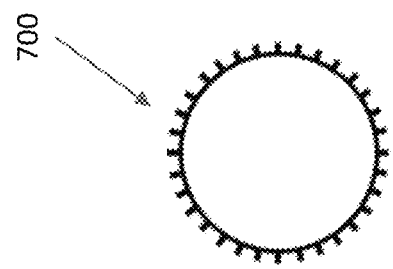
FIG. 7A shows a vertically coupled ring resonator with a grating structure as part of the ring.

FIGS. 7A-7C illustrate several designs of alternative compact, integrated optical modulators suitable for use in an APIC or other array of on-chip, photonic circuit modulator. Each modulator can be fabricated in SiN for operation in the visible and/or infrared regions of the electromagnetic spectrum and is fast enough (e.g., MHz or GHz switching rates) and repeatable enough for quantum control. And each modulator includes a ring or photonic crystal cavity whose resonance wavelength is tuned or modulated with an integrated piezoelectric actuator for faster switching (e.g., GHz rates for quantum control) and/or an integrated heater for slower tuning (e.g., kHz rates or lower for compensating manufacturing imperfections). These modulators can be fabricated with relatively high channel density (e.g., 5-10 modulators per square millimeter) and can operate with relative high efficiency (e.g., 10%, 15%, 20%, or higher) for APICs with large channel counts. Their extinction ratios vary and can be increased or augmented with external reference beams as described above with respect to FIG. 1A.

FIG. 7A shows a highly compact ring resonator modulator 700 that integrates an optical perturbation that scatters an Orbital Angular Momentum (OAM) mode into free-space. The modulator 710 depicted in FIG. 7B contains two gratings 712 and 714 connected by a waveguide 716 that is evanescently coupled to a ring resonator 718. One grating 712 can be used for exciting the mode of the ring resonator 718, while the other grating 714 projects the beam into free space. This configuration has several advantages. Because the gratings 712 and 714 are oriented at 90° as shown in FIG. 7B, the excitation and emitted modulated light are in orthogonal polarizations, making it easy to separate the excitation and modulated beams. In addition, the emission grating 714 can emit light at a slight angle compared to the surface normal of the chip, such that the excitation light, reflected light, and modulated, emitted light propagate in different directions and can be separated in the spatial Fourier domain. Combining a reference beam combined with the radiated field $A_{rad}$ can yield full light extinction for a specific wavelength. FIG. 7C shows a modulator that includes a vertically coupled photonic-crystal cavity 720 (resonator).

High-Speed Piezoelectric SLMs with Guided-Mode Resonances

Figure 8A:
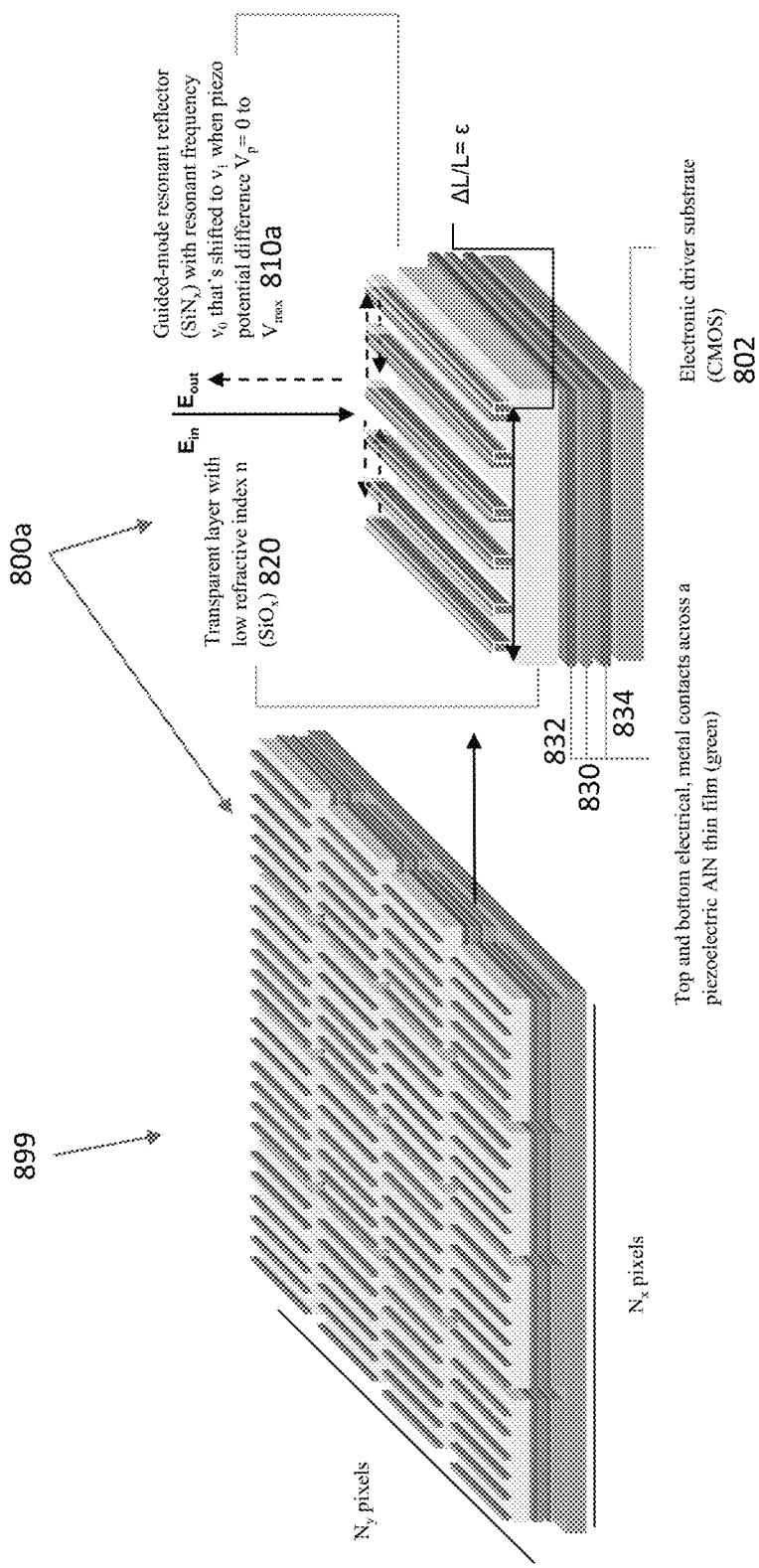
FIG. 8A illustrates a piezoelectric high-speed programmable metasurface based on a 1D gratings that act as guided-mode resonant filters in a spatial light modulator (SLM).

FIGS. 8A-8J illustrate SLMs, or more precisely SLM pixels, with piezoelectrically actuated, high-speed, programmable metasurfaces based on 1D gratings that act as guided-mode resonant filters. FIG. 8A shows an SLM 899 where each pixel 800a (close-up at right) is a resonant photonic device, or resonant pixel, with a guided-mode resonant grating 810a made out of $SiN_x$ on top of a $SiO_x$ cladding layer 820. The cladding is disposed on a layer of piezoelectric material 830, such as AlN, that is sandwiched between a pair of electrodes 832 and 834. The resonant pixels 800a in the SLM 899 can be fabricated on a CMOS electronic driver substrate 802, which contains electronic components coupled to the pixels 800a that drive (control) the pixels 800a.

The materials for the pixel 800a are available in semiconductor foundries and can be deposited at low temperatures (e.g., by atomic layer deposition, chemical vapor deposition, sputtering, evaporation, etc.), enabling their integration with CMOS circuitry. (SLMs with resonant pixels can be made using alternative resonant photonic devices, different materials, or methods to increase the strain/displacement (e.g., leading to enhanced modulation) as described below.) Altering the dimensions of the pixels 800a (e.g., grating duty cycle, $SiN_x$ thickness, and $SiO_x$ thickness) alters the real and imaginary parts of the pixels' reflection coefficients (i.e., a pixel's dimensions can be chosen to engineer the pixel's phase and amplitude responses).

In operation, applying a voltage to the piezoelectric layer 830 or element in a given pixel 800a with the pixel's electrodes 832 and 834 causes the piezoelectric layer 830 to expand or contract. This expansion or contraction can be lateral, axial, or both. The piezoelectric layer's change in shape strains the guided-mode resonant grating 810a, changing the grating's resonant frequency. This changes the pixel's reflectivity. Shining a beam of light on the pixel 800a while applying a voltage to the pixel's piezoelectric layer 830 modulates phase and/or amplitude of the beam reflected by the pixel 800a. The SLM 899 can include hundreds to thousands of guided-mode resonance pixels 800a, each of which can modulate incident light at GHz rates with good repeatability, making SLMs with guided-mode resonance pixels well-suited for use in an APIC.

Figures 8B, 8C, 8D:
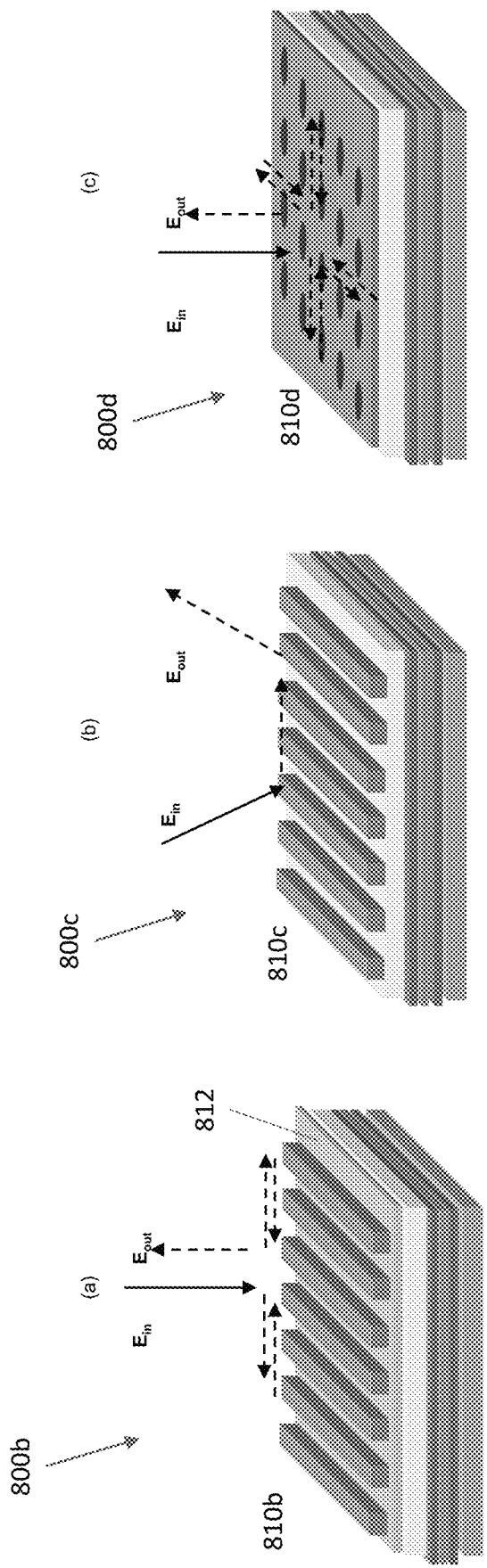
FIG. 8B illustrates a guided-mode resonant pixel design based on a shallow etched grating instead of fully etched grating or grating on a high-index slab, e.g., to get resonances with a higher quality (Q) factor.
FIG. 8C shows a resonant pixel with gratings that work at non-normal incidence.
FIG. 8D shows a resonant pixel with a two-dimensional (2D) photonic crystal (PhC; air holes in a silicon nitride slab) instead of a one-dimensional (1D) grating acting as a guided-mode resonant reflector.

FIGS. 8B-8D show pixels 800b-800d with guided-mode resonant gratings 810b-810d that can be used as an alternative to the guided-mode resonant grating 810a in FIG. 8A. FIG. 8B shows a pixel 800b with either a shallow etched grating 810b or a grating on a high-index slab 812 instead of a fully etched grating. (The shallow etched grating 810b could be on the high-index slab 812 as in FIG. 8B too but does not have to be.) Placing the grating on the high-index slab 812 increases the quality factor of the guided mode resonances. FIG. 8C shows a pixel 800c with a grating 810c that works at non-normal incidence. And FIG. 8D shows a pixel 800d with a 2D photonic crystal 810d (air holes in a silicon nitride slab) acting as a guided-mode resonant reflector instead of a one-dimensional (1D) grating.

Figure 9:
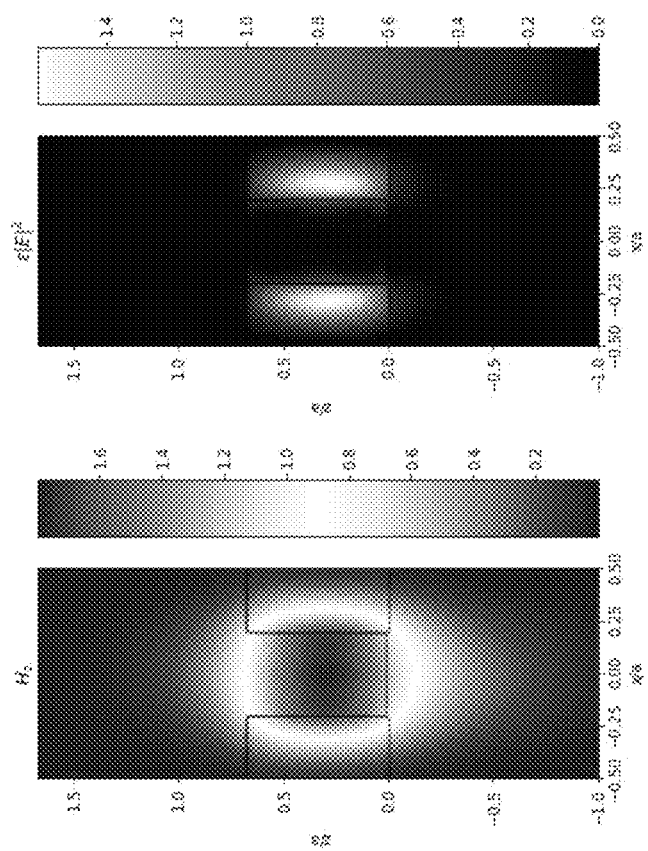
FIG. 9 depicts a bound-in-the-continuum (BIC) mode of the 2D PhC modulator of FIG. 8D.

One sample design for the 2D photonic crystal (PhC) 810d in FIG. 8D is a 0.3-micron-thick SiN layer patterned with a lattice of radius r=0.2a holes for the square lattice constant a=0.45 μm, yielding several resonant modes around the design wavelength λ~770 nm. One bound-in-the-continuum (BIC) mode, illustrated in FIG. 9, offers an infinite quality factor at normal incidence and high confinement in the silicon nitride region. This PhC pixel 800d can be made in the same foundry process used to fabricate the gratings.

Figure 10A:
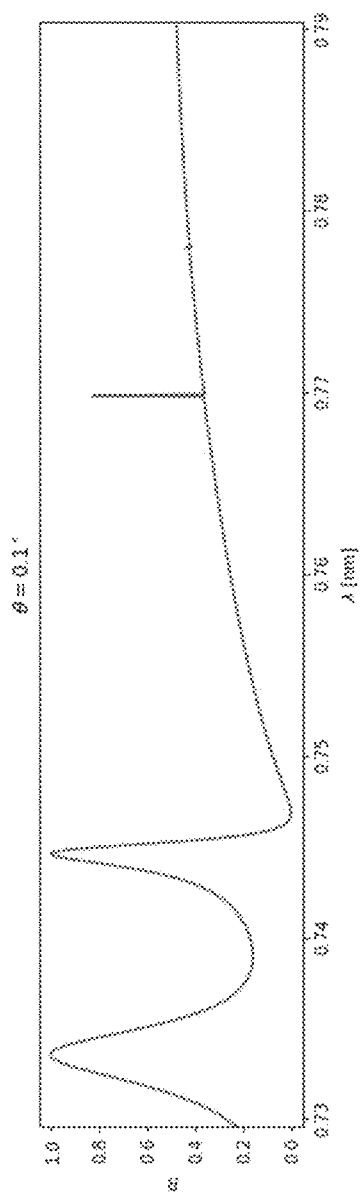
FIG. 10A shows a sample reflection spectrum for the 2D PhC modulator of FIG. 8D at near-vertical ($\theta=0.1°$) incidence.
Figure 10B:
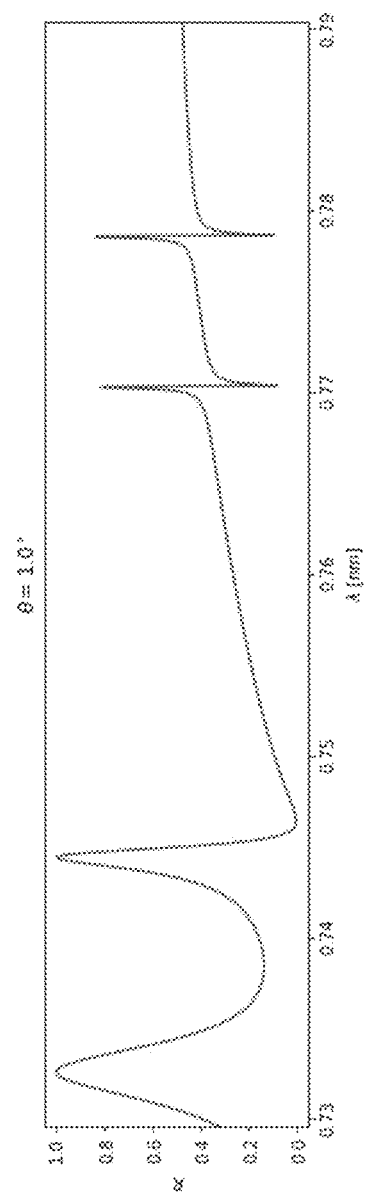
FIG. 10B shows a sample reflection spectrum for the 2D PhC modulator of FIG. 8D at oblique ($\theta=1°$) incidence.

FIGS. 10A and 10B show near-normal- and oblique-incidence reflection spectra, respectively, for the 2D PhC pixel in FIG. 8D. They depict the quality factor trends of BIC-type modes as a function of illumination angle. Other high-extinction, lower-quality-factor (Q) modes are also present at shorter wavelengths and may be favorable for certain applications.

High-Speed Piezoelectric SLMs with Dielectric Cavities

FIGS. 11A-11F show pixels 1100a-1100f with resonant photonic structures having dielectric cavities instead of 1D or 2D guided-mode resonant gratings like the pixels 800a-800d in FIGS. 8A-8D. Resonant photonic structures with dielectric cavities may form more compact structures (smaller pixels) than 1D or 2D guided-mode resonant gratings. These pixels 1100a-1100f can be made on the same CMOS substrate, with the same electrodes and piezoelectric layer, as described above with respect to FIG. 8A. They can also be tuned thermally, e.g., with integrated heaters (not shown).

FIG. 11A shows a pixel 1100a with PhC cavities 1110a. FIG. 11B shows a pixel 1100b with a high-contrast, sub-wavelength grating 1110b with waveguide-array modes propagating up and down in a dielectric cavity between the grating input plane and grating exit plane. The input and exit planes are formed by the top and bottom cladding-grating interfaces, respectively.

FIG. 11C shows a pixel 1100c with a resonant dielectric antenna 1110c. This resonant dielectric antenna 1110c includes an in-plane cavity. Light bounces back and forth in plane between the two curved, grating-based mirrors 1112 in the resonant dielectric antenna 1110c.

FIG. 11D shows a pixel 1100d two guided-mode resonant gratings 1110d-1 and 2 stacked on top of each other. At resonance, these gratings act as high-reflectivity mirrors that form a vertical Fabry-Perot cavity.

Figure 11F:
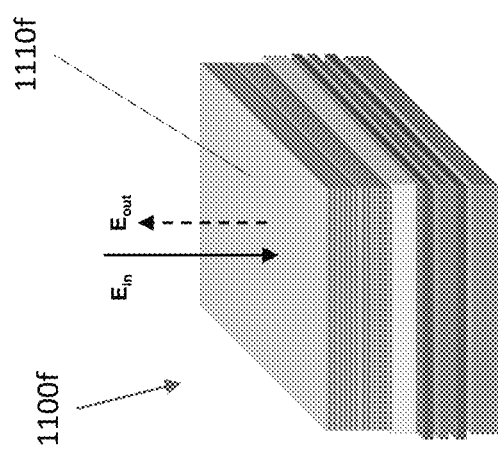
FIG. 11F shows a resonant pixel with a cavity formed by distributed Bragg reflectors. If the device is deformed laterally upon piezoelectric actuation, it will also deform in the vertical direction, leading to a resonance shift.
Figure 11E:
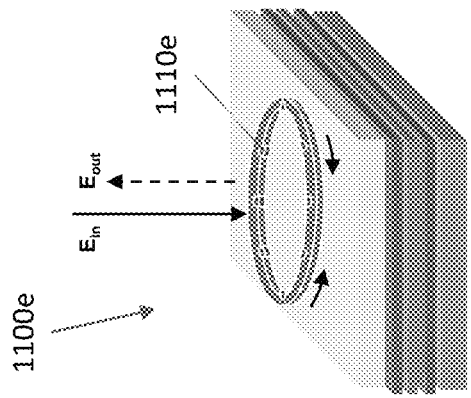
FIG. 11E shows a resonant pixel with a grating-assisted ring resonator. The grating ensures light can be coupled in and out of the ring resonator.

FIG. 11E shows a pixel 1100e with grating-assisted ring resonator 1110e, e.g., as in FIG. 7A, where notches etched on the inside of the ring resonator 1110e represent the grating, which is formed in the ring resonator 1110e. The grating couples light into and out of the ring resonator 1110e.

FIG. 11F shows a pixel 1100f topped with a cavity 1110f formed by distributed Bragg reflectors. Deforming the cavity laterally with the piezoelectric layer also deforms the cavity in the vertical direction, shifting the cavity's resonance frequency.

High-Speed Piezoelectric SLMs with Plasmonic Cavities

FIGS. 12A and 12B show pixels 1200a and 1200b, respectively, with metallic, plasmonic cavities instead of dielectric cavities as the resonant photonic structures. In FIG. 12A, the pixel 1200a has a 2D array of in-plane, plasmonic nanoantennas 1210a; in FIG. 12B, the pixel 1200b has a 1D array of vertical plasmonic nanoresonators 1210b. In both pixels, the metallic, plasmonic cavities are formed on a transparent, low-index layer 1220, which in turn is on a piezoelectric layer 1230 sandwiched between electrodes 1232 and 1234 and on a CMOS driver substrate 1202, just like the gratings and dielectric cavities described above and shown in FIGS. 8A-8D and 11A-11F.

Pixel Materials

The piezoelectric thin film in each can include AlN, AlScN, lead zirconate titanate (PZT), barium titanate (BTO), ZnO, ZnS, or any other suitable piezoelectric material. Materials exhibiting a stronger piezoelectric effect can give larger displacements for a given applied voltage.

The resonant photonic structure(s) in each pixel can be made of different materials (e.g., dielectrics, semiconductors, metals). The materials can be selected based on the desired wavelength of operation. For instance, suitable materials include silicon nitride, silicon oxide, silicon, III-V semiconductors, and/or other oxides or nitrides.

The resonant pixels can be made using standard low-temperature deposition techniques, such as atomic layer deposition, sputtering, evaporation, chemical vapor deposition. They can also be made using bonding or transfer printing, e.g., to integrate high-quality, crystalline materials that cannot be easily deposited.

Figure 13:
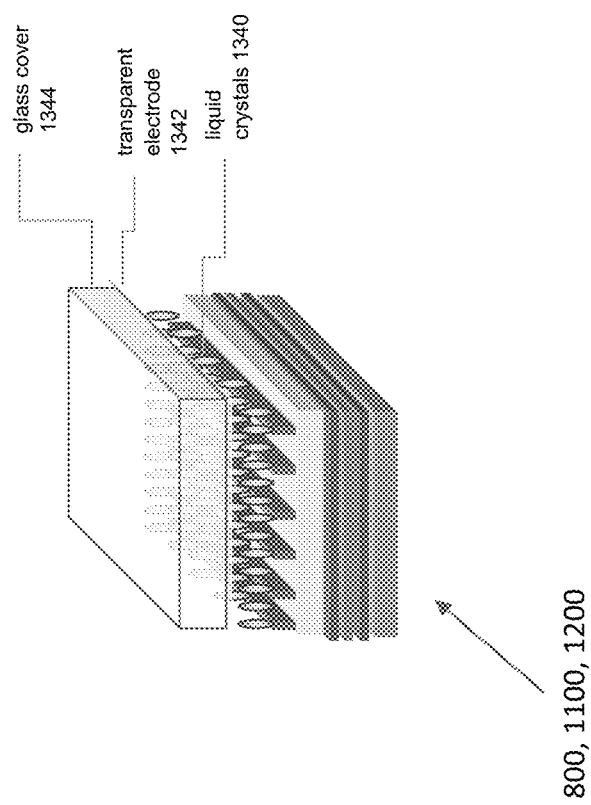
FIG. 13 shows liquid crystals used for resonance tuning of a resonant pixel.

Depending on the application, fabrication precision, and device architecture, it may be desired to tune the pixel resonances post-fabrication. This could be achieved by depositing a liquid crystal layer 1340 on top of the resonant photonic structure(s) as shown in FIG. 13. The liquid crystal layer 1340 is topped with a transparent cover 1344 (e.g., a glass layer). Indium tin oxide or other transparent electrodes 1342 on the side of the transparent cover 1344 facing the liquid crystal layer 1340 apply a voltage to the liquid crystal layer 1340, tuning the refractive index of the liquid crystal layer 1340. Alternatively, resistive heaters can be used instead of liquid crystal materials to tune the pixel resonances by heating the resonant photonic structure(s), e.g., as described above with respect to the DRMZM shown in FIGS. 2A and 2B.

Strain/Displacement Amplification

Figure 14:
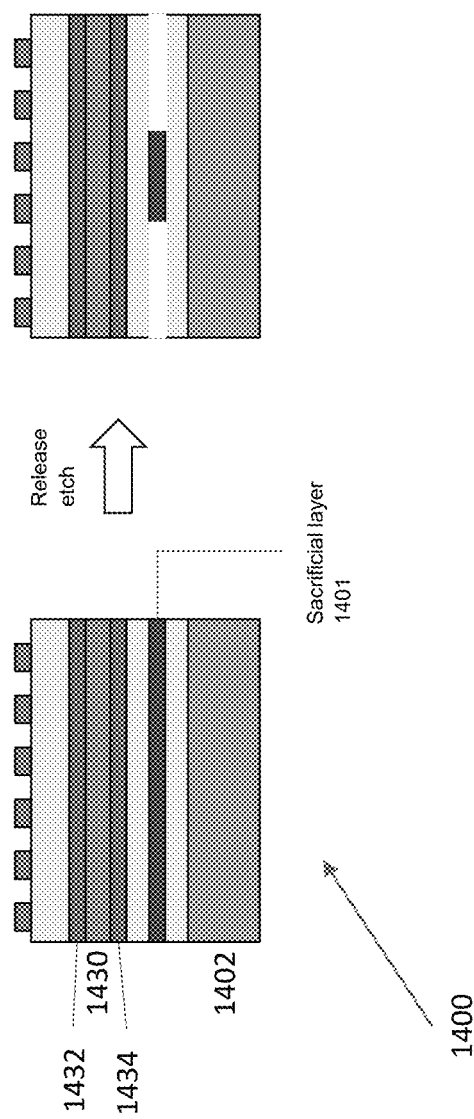
FIG. 14 illustrates selectively etching a sacrificial layer to create a more compliant device.

Piezoelectric strain and the resulting displacement of the resonant structure can be amplified in several ways, including undercutting or underetching pixels, concentrating strain with multiple piezoelectric actuators per pixel, and amplifying strain with mechanical resonances. FIG. 14 shows a resonant pixel 1400 with a sacrificial layer 1401 beneath a piezoelectric actuator formed by a piezoelectric layer 1430 sandwiched between electrodes 1432 and 1434 (left). Etching the sacrificial layer (right) enhances the piezoelectrically induced strain by creating a more compliant device. An example of a sacrificial layer 1402 is amorphous silicon, which can be etched by $XeF_2$ gas.

Figure 15:
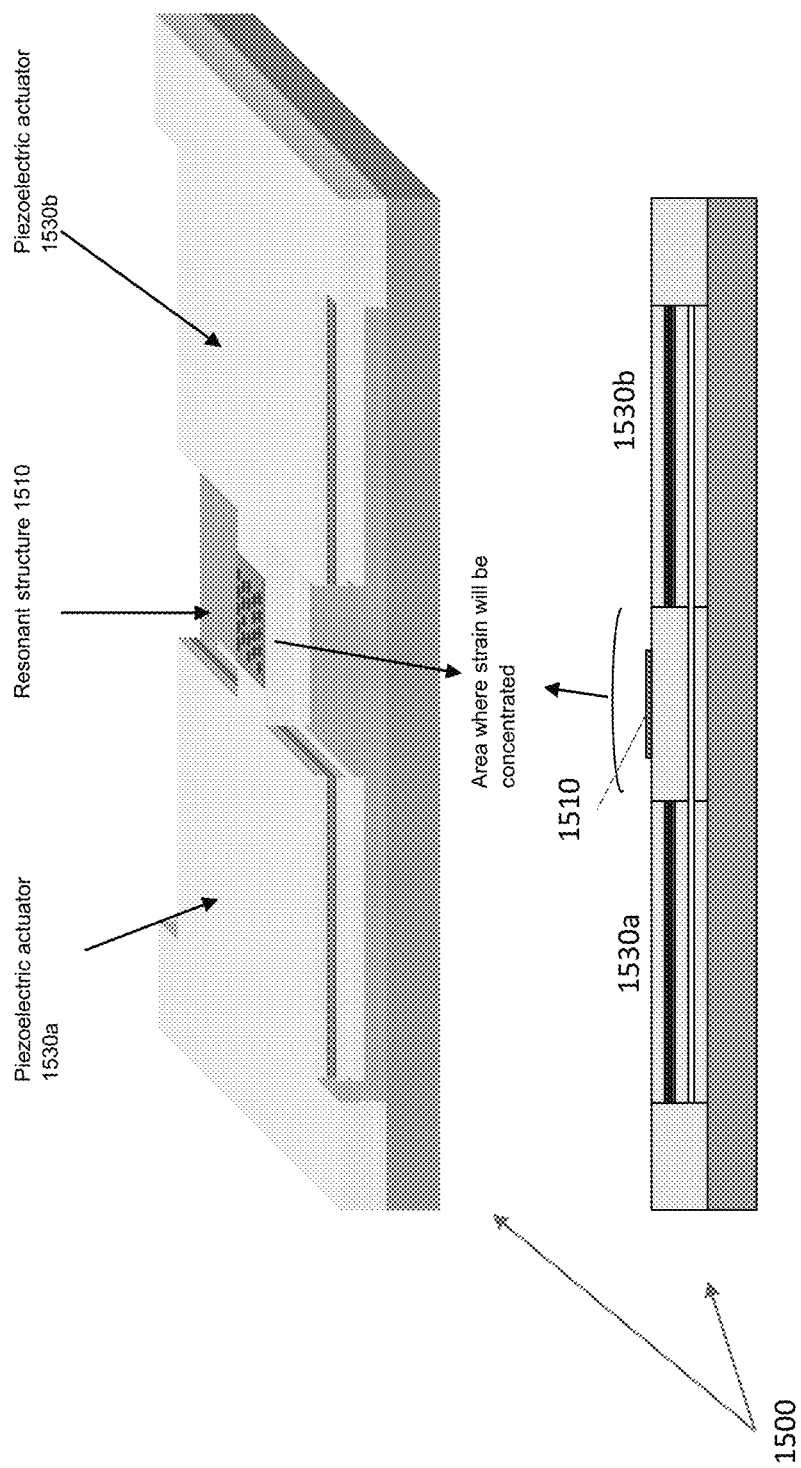
FIG. 15 illustrates a strain concentrator configured to get larger strain in a resonant pixel.

FIG. 15 illustrates a strain concentrator 1500 for a resonant pixel or set of pixels. A resonant photonic structure 1510 is placed in between two piezoelectric actuators 1530a and 1530b. Driving the piezoelectric actuators 1530a and 1530b causes them to expand or contract laterally, which significantly compresses or stretches a resonant photonic structure 1510 between the piezoelectric actuators 1530a and 1530b. The piezoelectric actuators 1530a and 1530b and resonant photonic structure 1510 can be underetched to facilitate expansion and/or contraction.

Driving the piezoelectric actuators at a mechanical resonance frequency amplifies the strain experienced by the resonant photonic structures. At resonance, the displacement is enhanced by the mechanical Q-factor with respect to the DC displacement. Engineering the resonant pixels to have the desired mechanical resonance frequency enables very efficient optical modulation at the design driving frequency.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain, using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided.

The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method of addressing a qubit in an array of qubits, the method comprising:
    coupling an excitation beam in a first polarization state into a resonator in an array of resonators integrated into a chip;
    modulating the excitation beam with the resonator;
    coupling the excitation beam from the resonator out of the chip and into free space in a second polarization state orthogonal to the first polarization state; and
    illuminating the qubit with the excitation beam.

2. The method of claim 1, further comprising, before illuminating the qubit with the excitation beam, combining the excitation beam with a reference beam.

3. The method of claim 2, further comprising, before combining the excitation beam with the reference beam, spatially modulating the reference beam.

4. The method of claim 2, wherein combining the excitation beam with the reference beam causes destructive interference between the excitation beam and the reference beam.

5. The method of claim 4, wherein the reference beam has an amplitude and/or a phase selected to suppress the excitation beam by at least 30 dB.

6. The method of claim 1, further comprising, before coupling the excitation beam into the resonator, spatially modulating the excitation beam.

7. The method of claim 1, wherein modulating the excitation beam with the resonator comprises driving the resonator at a mechanical resonance frequency of the resonator.

8. The method of claim 1, wherein:
    coupling the excitation beam into the resonator comprises directing the excitation beam through a first port of a polarizing beam splitter towards the resonator, and
    illuminating the qubit with the excitation beam comprises directing the excitation beam from the resonator through a second port of a polarizing beam splitter towards the qubit.

9. A system for controlling an array of qubits, the system comprising:
    a spatial light modulator (SLM) to fan out an excitation beam into an array of excitation beams in a first polarization state;
    a polarizing beam splitter (PBS), in optical communication with the SLM, to direct the array of excitation beams; and
    an atom-control photonic integrated circuit (APIC), in optical communication with the PBS, to generate an array of pulses in a second polarization state orthogonal to the first polarization state from the array of excitation beams and to project the array of pulses onto the array of qubits via the PBS.

10. The system of claim 9, wherein the APIC comprises:
an array of modulators, formed in the APIC, to produce the array of pulses from the array of excitation beams;
an array of input couplers, formed in the APIC in optical communication with the array of modulators, to couple the array of excitation beams into the array of modulators; and
an array of output couplers, formed in the APIC in optical communication with the array of modulators, to couple the array of pulses out of the APIC.

11. The system of claim 10, wherein each modulator in the array of modulators comprises a dual-ring Mach-Zehnder modulator (DRMZM) having ring resonators with resonant frequencies tuned by respective piezoelectric elements and respective integrated heaters.

12. The system of claim 10, wherein the APIC further comprises:
a complementary metal-oxide-semiconductor (CMOS) substrate supporting the array of modulators and containing electronic components, operably coupled to the array of modulators, to drive the array of modulators.

13. The system of claim 9, wherein the SLM is a first SLM, and further comprising:
a second SLM to fan out a reference beam into an array of reference beams; and
a beam splitter, in optical communication with the APIC and the second SLM, to combine the array of reference beams with the array of pulses.

14. The system of claim 9, wherein the SLM comprises:
an array of pixels, each pixel in the array of pixels comprising:
a resonant photonic structure to reflect incident light at a resonance frequency; and
a piezoelectric actuator, in mechanical communication with the resonant photonic structure, to strain the resonant photonic structure, thereby changing a reflectance of the resonant photonic structure.

15. The system of claim 14, wherein the resonant photonic structure comprises at least one of a grating, a dielectric structure defining a cavity, a nanoantenna, a photonic crystal, or a plasmonic structure.

16. The system of claim 14, wherein the piezoelectric actuator comprises a layer of piezoelectric material and the resonant photonic structure is disposed on the layer of piezoelectric material.

17. The system of claim 14, wherein the piezoelectric actuator is a first piezoelectric actuator on a first side of the resonant photonic structure and further comprises:
a second piezoelectric actuator, on a second side of the resonant photonic structure, to laterally strain the resonant photonic structure with the first piezoelectric actuator.

18. The system of claim 14, further comprising:
a layer of liquid crystal material, in electromagnetic communication with the resonant photonic structure, to tune the resonance frequency of the resonant photonic structure.

19. The system of claim 14, further comprising:
a heater, in thermal communication with the resonant photonic structure, to tune the resonance frequency of the resonant photonic structure.

20. The system of claim 14, further comprising:
a complementary metal-oxide-semiconductor (CMOS) substrate supporting the array of pixels and containing electronic components, operably coupled to the array of pixels, to drive the array of pixels.

* * * * *